United States Patent [19]
Staelin et al.

[11] Patent Number: 6,050,357
[45] Date of Patent: Apr. 18, 2000

[54] POWERED SKATEBOARD

[75] Inventors: David H. Staelin, Wellesley; Jeffrey H. Lang, Sudbury, both of Mass.

[73] Assignee: EMPower Corporation, Cambridge, Mass.

[21] Appl. No.: 08/952,173

[22] PCT Filed: May 31, 1995

[86] PCT No.: PCT/US95/06985

§ 371 Date: Nov. 13, 1997

§ 102(e) Date: Nov. 13, 1997

[51] Int. Cl.[7] ..................................................... A63C 3/00
[52] U.S. Cl. ................... 180/65.1; 180/181; 280/87.042
[58] Field of Search .................. 180/65.1, 65.5, 180/65.6, 180, 181, 272, 279, 284; 280/87.041, 87.042, 11.19, 11.27, 11.28

[56] References Cited

U.S. PATENT DOCUMENTS

| | | | |
|---|---|---|---|
| 4,073,356 | 2/1978 | Schlicht | 180/181 |
| 4,274,647 | 6/1981 | Drake, Jr. | 280/87.042 |
| 4,984,648 | 1/1991 | Strzok | 180/181 |
| 5,020,621 | 6/1991 | Martin | 180/181 |
| 5,381,870 | 1/1995 | Kaufman | 180/181 |
| 5,487,441 | 1/1996 | Endo et al. | 180/181 |

*Primary Examiner*—Brian L. Johnson
*Assistant Examiner*—Bridget Avery
*Attorney, Agent, or Firm*—Fish & Richardson P.C.

[57] ABSTRACT

A powered skateboard including a foot support, multiple wheels mounted to the foot support, and a motor coupled to at least one of the wheels. The powered skateboard further includes an active control system having a sensor located on the skateboard and a controller. The controller receives electrical signals from the sensor and electrical signals from the motor, which indicate the state of the motor. In response to those signals and in accordance with a control mechanism, the controller sends electrical signals to the motor to control the operation of the motor.

170 Claims, 13 Drawing Sheets

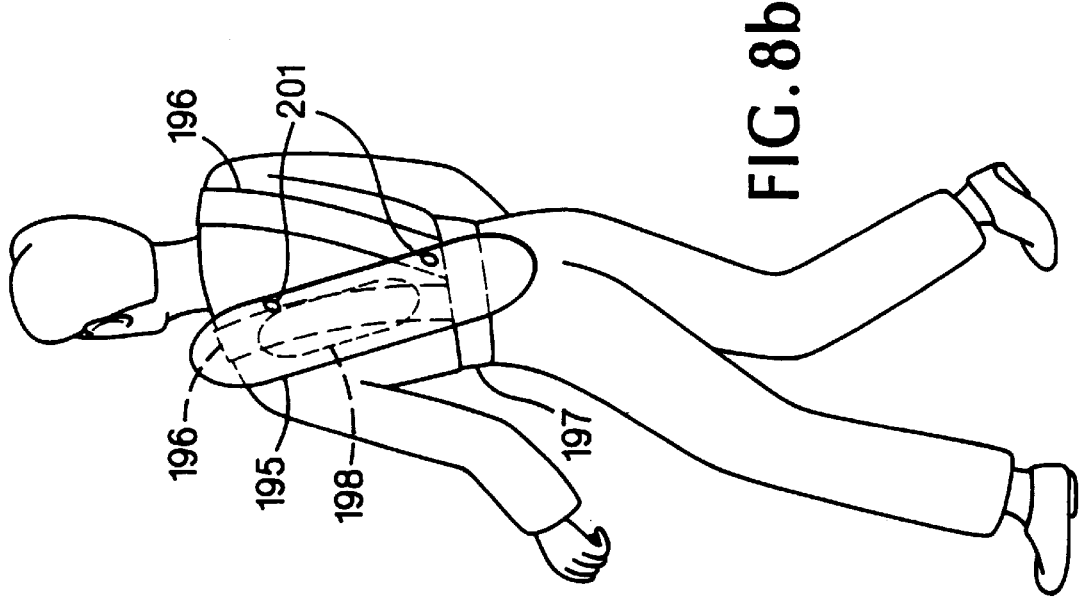
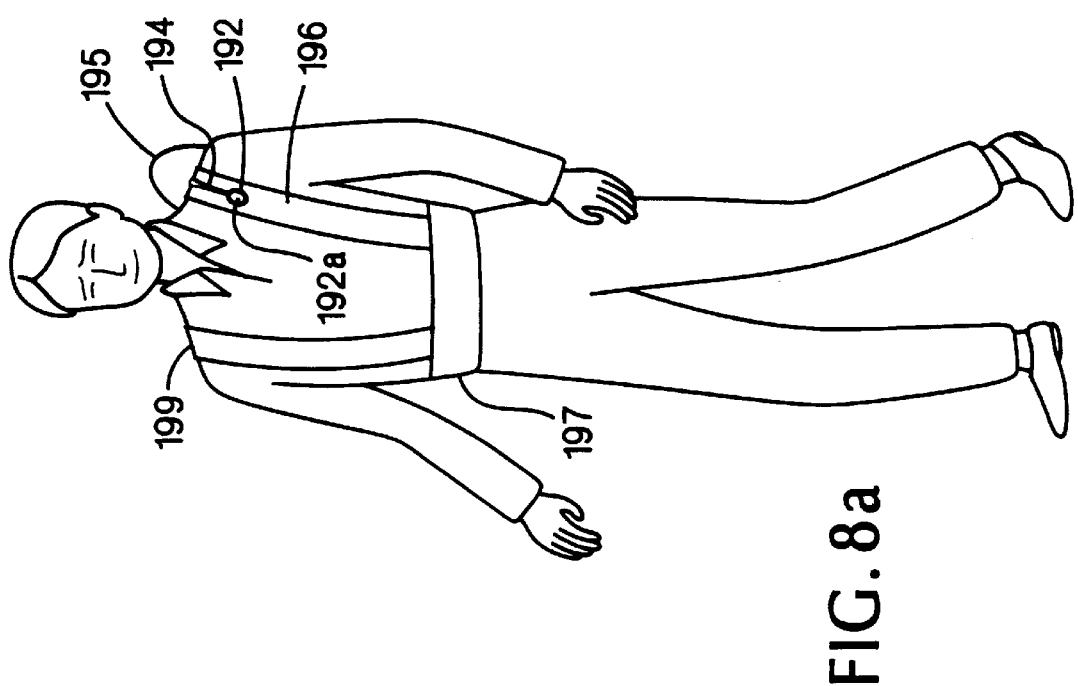

POWERED SKATEBOARD

BACKGROUND

This invention relates to powered, lightweight, individualized personal transport methods and apparatus, and more particularly, to powered skateboards.

Power has been applied to the wheels of skateboards in many different ways. Often, a motor is worn on the user's back and connected to the skateboard's wheels through a flexible drive. Alternatively, the motor is mounted to the skateboard and directly connected to the skateboard's wheels. Where the motor is an internal combustion engine, a fuel tank is required, and the fuel tank is either worn by the user or mounted to the skateboard.

Generally, speed control is provided by a hand- or foot-controlled mechanical device, for instance, hip handles, a tiltable foot support or an attached handlebar with control. The hand controlled devices may be electrically connected to the motor for direct control or may include a wireless transmitter for remote control. Hand controls can be awkward, unnatural, and possibly dangerous when sudden changes occur. A user can initiate braking or motor-starting through a tiltable foot support by depressing or tilting the forward or rear portions of the foot support platform. The skateboard's foot support has also included devices to assist in steering, for example, a pivoted sole piece. These foot-controlled devices often require significant foot motion, and as a result, they can be difficult to operate.

SUMMARY

In one aspect, the invention relates to a powered skateboard having a foot support, multiple wheels mounted to the foot support, and a motor coupled to at least one of the wheels. The invention features an active control system having at least one sensor located on the skateboard and a controller. The controller receives electrical signals from the sensors and further, electrical signals from the motor which indicate the state of the motor. In response to those signals and, in accordance with a control mechanism, the controller sends electrical signals to the motor to control the operation of the motor.

In another aspect, the invention relates to a powered skateboard having a foot support, multiple wheels mounted to the foot support, and a motor coupled to at least one of the wheels. The invention features an active control system having at least one sensor, at least one detector for detecting an operational mode of the skateboard, and a controller. The controller receives electrical signals from the sensors and further electrical signals from the detectors which indicate the operational mode of the skateboard and electrical signals from the motor which indicate the state of the motor. In response to those signals and, in accordance with the selected operational mode and a control mechanism, the controller sends electrical signals to the motor to control the operation of the motor.

In another aspect, the invention relates to an automatic braking system for use with a powered skateboard having multiple wheels. The invention features determining means which determine when the skateboard has been stationary for a predetermined amount of time and which send an electrical signal indicating such determination to preventing means which respond to the electrical signal by preventing at least one of the wheels from turning. The invention also features detecting means which detect a restart trigger and which send an electrical signal indicating such detection to the preventing means which allows the wheels to turn.

In another aspect, the invention relates to an automatic acceleration system for use with a powered skateboard having multiple wheels and a motor coupled to at least one of the wheels. The invention features detecting means which detect a start trigger and which send an electrical signal that indicates such detection to a causing means which accelerates the skateboard.

In another aspect, the invention relates to a powered skateboard having a foot support, multiple wheels mounted to the foot support, and a motor coupled to at least one of the wheels. The invention features an active control system having a controller and a communication mechanism for communicating information about the skateboard external to the skateboard. The controller receives electrical signals from the communication mechanism and, in accordance with a control mechanism, sends electrical signals to the communication mechanism to cause the communication mechanism to indicate a status of the skateboard external to the skateboard.

In another aspect, the invention relates to a powered skateboard having a foot support, multiple wheels mounted to the foot support, and a motor coupled to at least one of the wheels. The invention features an active control system having a controller and a communication device for communicating information about the skateboard external to the skateboard. The controller sends electrical signals to the communication device to cause the communication device to indicate a status of the skateboard external to the skateboard. The controller receives electrical signals from the communication device and, in accordance with a control mechanism, modifies the control mechanism and control parameters to update the control mechanism.

In another aspect, the invention relates to a powered skateboard having a foot support, multiple wheels mounted to the foot support, and a motor coupled to at least one of the wheels. The invention features an active control system having at least one sensor and a controller. The controller receives electrical signals from the sensor and, in accordance with a control mechanism, modifies control parameters to update the control mechanism.

In another aspect, the invention relates to a security system for use with a powered skateboard having multiple wheels. The invention features detecting means which detects an end-of-use trigger and which sends an electrical signal indicating such detection to preventing means which responds to the electrical signal by preventing at least one of the wheels from turning. The invention also features another detecting means which detects a security trigger and which sends an electrical signal indicating such detection to the preventing means which responds by allowing the wheels to turn.

In another aspect, the invention relates to a powered skateboard having a foot support, multiple wheels mounted to the foot support, and a motor coupled to at least one of the wheels. The invention features an active control system having a controller and at least one detector that detects when a user last imposed his or her full weight on the skateboard. The controller receives electrical signals from the detector and further electrical signals from the motor which indicate the state of the motor and, in accordance with a control mechanism, sets the motor torque to cause the motor to maintain a skateboard velocity established when the user last imposed full weight on the skateboard.

In another aspect, the invention relates to a powered skateboard having a foot support, multiple wheels mounted to the foot support, and a motor coupled to at least one of the wheels. The invention features an active control system having a controller and at least one detector that detects a user's weight distribution across the foot support. The controller receives electrical signals from the detector and further electrical signals from the motor which indicate the state of the motor and, in accordance with a control mechanism, sends electrical signals to the motor to activate the motor such that skateboard velocity is increased and decreased according to the user's weight distribution across the foot support.

In another aspect, the invention relates to a powered skateboard having a foot support, multiple wheels mounted to the foot support, and a motor coupled to at least one of the wheels. The invention features an active control system having a controller and at least one segmented detector that detects a user's weight distribution imposed on the foot support by each of the user's legs. The controller receives electrical signals from the detector and further electrical signals from the motor which indicate the state of the motor and, in accordance with a control mechanism, sends electrical signals to the motor to activate the motor such that skateboard velocity is increased and decreased according to the user's weight distribution imposed on the foot support by each of the user's legs.

In another aspect, the invention relates to a powered skateboard having a foot support, multiple wheels mounted to the foot support, and a motor coupled to at least one of the wheels. The invention features an active control system having a controller and at least one segmented foot-presence detector that detects an angle between a user's front foot and a longitudinal axis of the skateboard, and also an angle between the user's back foot and the longitudinal axis of the skateboard. The controller receives electrical signals from the detector and further electrical signals from the motor which indicate the state of the motor and, in accordance with a control mechanism, sends electrical signals to the motor to activate the motor such that skateboard velocity is increased and decreased according to the angles between the user's feet and the longitudinal axis of the skateboard.

In another aspect, the invention relates to a powered skateboard having a foot support, multiple wheels mounted to the foot support, and a motor coupled to at least one of the wheels. The invention features an active control system having a controller and at least one segmented detector for detecting a user's weight distribution across each of the user's feet. The controller receives electrical signals from the detector and further electrical signals from the motor which indicate the state of the motor and, in accordance with a control mechanism, sends electrical signals to the motor to activate the motor such that skateboard velocity is increased and decreased according to the user's weight distribution across each of the user's feet.

In another aspect, the invention relates to a powered skateboard having a foot support, multiple wheels mounted to the foot support, and a motor coupled to at least one of the wheels. The invention features an active control system having a controller and at least one detector that detects a distance between a user's feet. The controller receives electrical signals from the detector and further electrical signals from the motor which indicate the state of the motor and, in accordance with a control mechanism, sends electrical signals to the motor to activate the motor such that skateboard velocity is increased and decreased according to the distance between the user's feet.

In another aspect, the invention relates to a powered skateboard having a foot support, multiple wheels mounted to the foot support, and a motor coupled to at least one of the wheels. The invention features an active control system having a controller and at least one detector that detects an exercise mode of the skateboard. The controller receives electrical signals from the motor which indicate the state of the motor and further electrical signals from the detector which indicate the exercise mode and, in accordance with a control mechanism, sends electrical signals to the motor to cause the motor to apply a resisting torque to one or more of the plurality of wheels.

Embodiments of the invention may include one or more of the following advantages: For example, sensors send electrical signals to the controller which represent the natural skateboarding motions of the user. Using these natural skateboarding signals and electrical signals from other sensors representing motor status (for example, temperature) and electrical signals from the motor representing the actual state of the motor (for example, torque, velocity, load), the controller actively controls the operation of the motor, and, hence, the skateboard. The skateboard responds to the user's natural skateboarding motions without requiring the user to move hand- or foot-controls (hands-off, lever-less). Thus, the skateboard anticipates the user's intentions without introducing user instability.

Additionally, the controller provides multiple skateboarding modes which provide the user with many skateboarding options. The natural transition between the skateboarding modes is accomplished with minimal user attention and, thus, does not introduce user instability. A handle on the skateboard permits a user to carry the board through areas where wheeled transportation is inappropriate or dangerous, such as on public conveyances or on stairways. Many wheel configurations are also possible, for example: two forward and two backward; or one forward and two backward; or one forward, one rearward, and two centered.

BRIEF DESCRIPTION OF THE DRAWINGS

FIGS. 8a and 8b are front and back views, respectively, of a user carrying a powered skate board in a travel bag mounted to a harness.

DETAILED DESCRIPTION

Figure 1A:
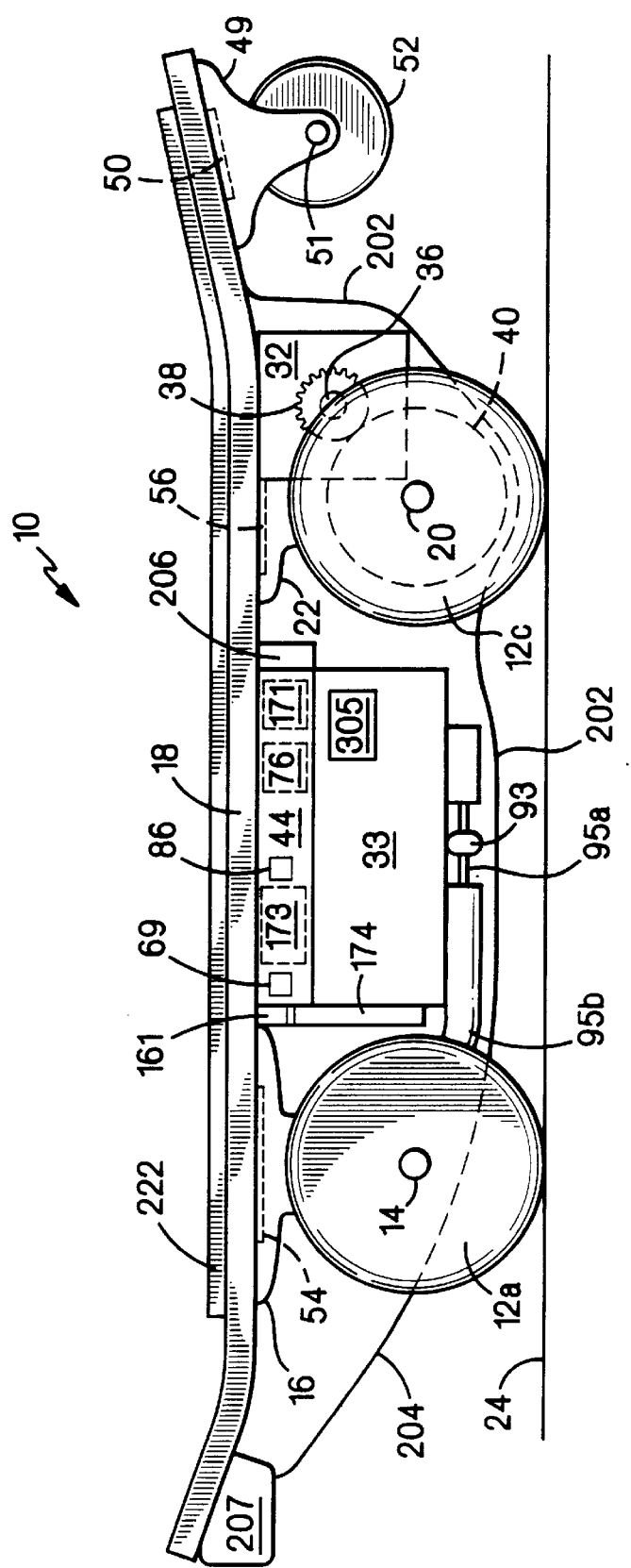
FIG. 1a, is a side view of one embodiment of a powered skateboard according to the invention.
Figure 1B:
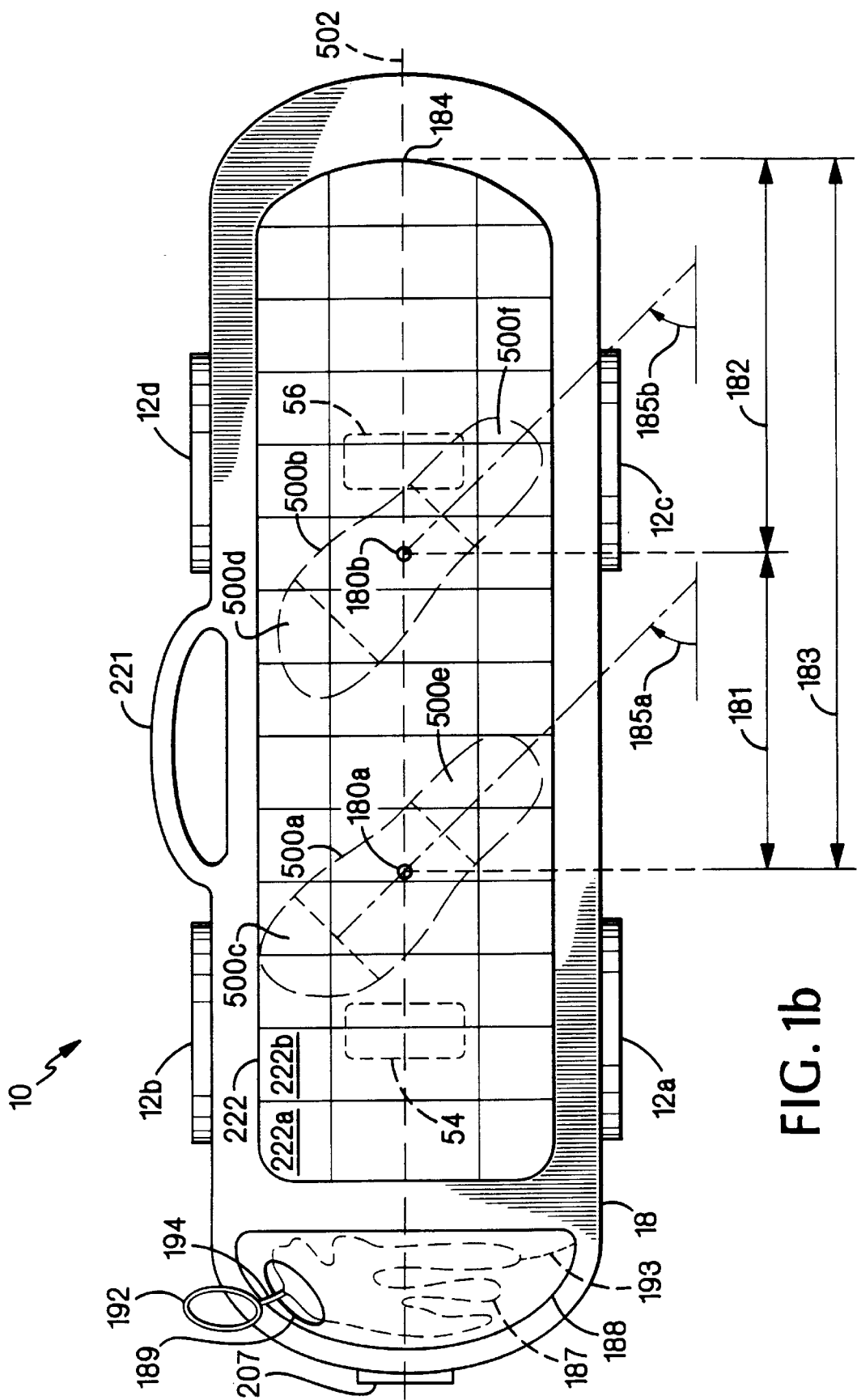
FIG. 1b is a top view of one embodiment of a powered skateboard according to the invention.
Figure 1C:
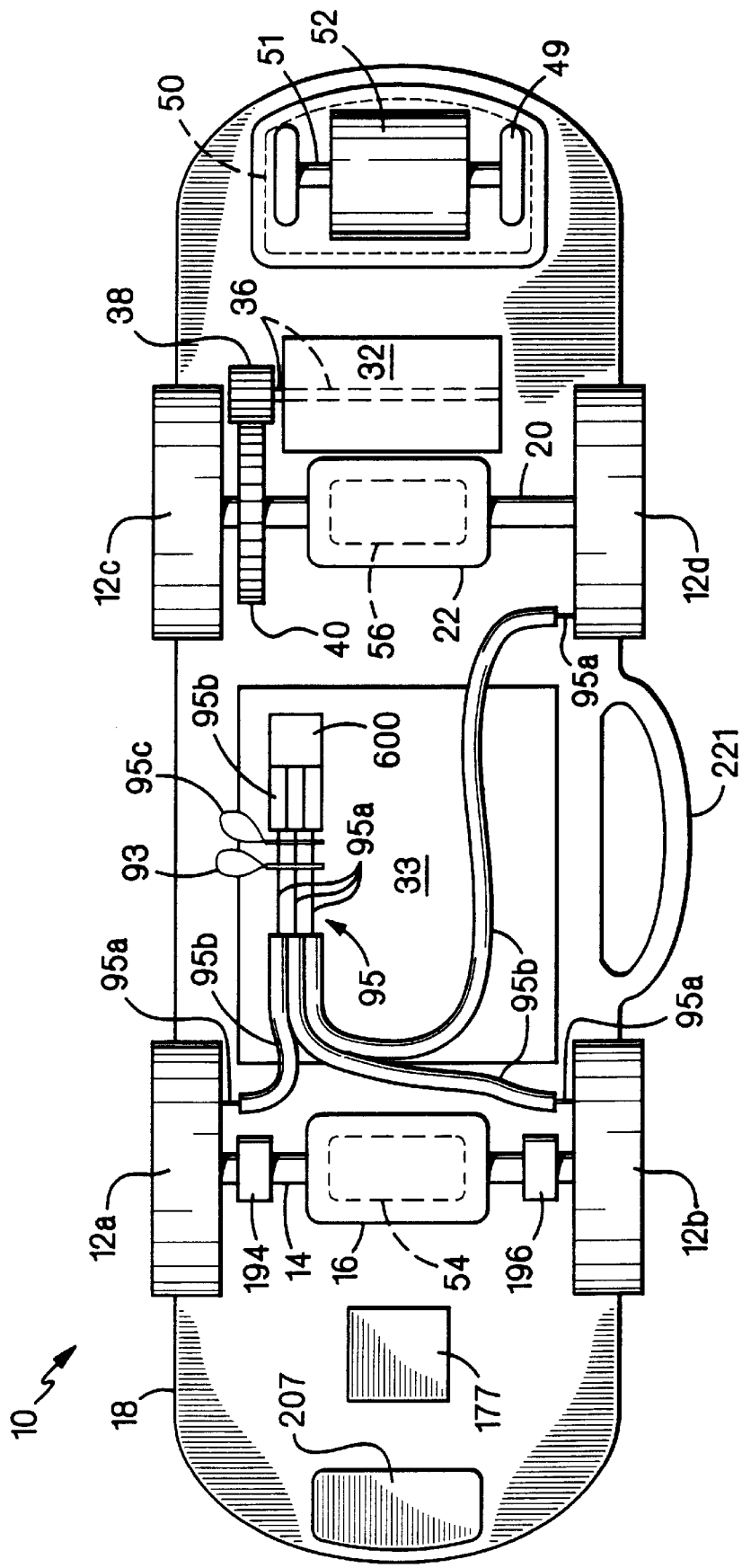
FIG. 1c is a bottom view of one embodiment of a powered skateboard according to the invention.

Referring to FIGS. 1a, 1b, and 1c, a skateboard 10 includes two front wheels 12a and 12b and two rear wheels 12c and 12d. Front wheels 12a, 12b spin about an axle 14 that is supported by an axle-support assembly 16 mounted to a foot support 18, and rear wheels 12c, 12d spin about an axle 20 that is supported by an axle-support assembly 22 also mounted to foot support 18. The wheels support the user above a surface 24, for example, a road, in a balanced fashion that minimizes undesirable ankle torque.

Skateboard 10 further includes a battery-driven electric motor 32 and a battery pack 33 mounted to foot support 18. Battery pack 33 contains, for example, sixteen D-cell NiCd rechargeable batteries and is electrically coupled to motor 32 through a power electronics unit 76 to supply electricity to motor 32. Motor 32 is mechanically coupled to rear wheel 12c through a pair of gears 38, 40. Larger gear 40 is centered around and attached to rear wheel axle 20, while smaller gear 38 is centered around and attached to a motor axle 36. The surfaces of gears 38, 40 engage to enable motor 32 to apply torque to rear wheel axle 20, and because gear 40 is, for example, four times larger than gear 38, the combination multiplies the motor torque applied to rear wheel axle 20. The surfaces of gears 38, 40, may be toothed or toothless. Alternatively, gears 38, 40 may be replaced by a toothed belt drive providing the same gear ratio. Motor 32 is preferably a brushless, permanent magnet motor that experiences substantially no mechanical wear and is configured to regenerate power to recharge the rechargeable batteries in battery pack 33 or drive external equipment (not shown) when wheels 12c and 12d are rotated without being driven by motor 32, for example, if the user skateboards with his or her own physical effort or rolls down a hill.

A controller 44 is also mounted to foot support 18 and is electrically connected to battery pack 33 to receive electricity from battery pack 33. Controller 44 is also electrically connected to several sensors, including three user pressure sensors, (for example, force sensitive resistors of the kind manufactured by Interlink Electronics): a brake sensor 50 imbedded within the support structure 49 of a rear braking surface 52; a forward weight distribution sensor 54 imbedded within front axle support assembly 16; and a rearward weight distribution sensor 56 imbedded within a rear axle support assembly 22. One method of stopping skateboard 10 requires the user to push rear braking surface 52 down against road surface 24 where it skids. The friction between rear braking surface 52 and the road surface will cause the skateboard to slow down and eventually stop. An alternate method of stopping skateboard 10 allows rear braking surface 52 to roll without skidding, rotating about axle 51, and which with a friction surface located elsewhere, for example, attached to axle 51, provides braking with less wear. When the user pushes rear braking surface 52 down against the road surface, braking sensor 50 detects an amount of pressure and sends an electrical signal representing the amount of pressure to controller 44. In response to this signal, controller 44 sends electrical signals to motor 32, through power electronics unit 76, causing motor 32 to apply reverse torque, in an amount corresponding to the amount of detected pressure, to rear wheel axle 20 to further slow or stop skateboard 10. Forward weight sensor 54 measures the distribution of the user's weight on the forward portion of the foot support, while rearward weight sensor 56 measures the distribution of the user's weight on the rearward portion of the foot support. Both forward and rearward weight distribution sensors 54, 56 send electrical signals to controller 44 indicating the distribution of weight on the associated portions of foot support 18. In response to the electrical signals from weight distribution sensors 54 and 56, controller 44 sends electrical signals to motor 32, through power electronics unit 76, to cause motor 32 to provide forward or reverse torque, in an amount corresponding to the detected forward and rearward distribution of the user's weight to rear wheel axle 20 to accelerate or brake skateboard 10. The operation of controller 44 will be discussed in more detail below.

Sensor 222 is composed of two or more subsensors, for example, 222a and 222b, responding to local pressure, in one embodiment, and local foot proximity, in another embodiment. Foot proximity can be sensed, for example, by sensing increases in the electrical capacitance of the subsensor. These subsensors provide data that controller 44 interprets in terms of one or more of the parameters Q, d, QF, or A. In one instance, the parameter Q is defined as $(F-R)/(F+R)$, where F is the weight detected by the sensor 54 and R is the weight detected by sensor 56. Alternatively, F is the total weight detected by subsensors within sensor 222 located forward on the skateboard, and R is the total weight detected by subsensors within sensor 222 located rearward. The parameter d is defined as a distance 181 (FIG. 1b) between a center 180a of those subsensors in sensor 222 simulated by a forward foot (indicated by outline 500a), and the center 180b of those subsensors in sensor 222 simulated by a rearward foot (indicated by outline 500b). Alternatively, d may be defined as the distance 182 between a rearward end 184 of sensor 222 and center 180b, or the distance 183 between rearward end 184 and center 180a, or the average of the distances 182 and 183. The parameter QF is defined as $(F'-R')/(F'+R')$, where F' is the total weight detected by the subsensors in sensor 222 corresponding to the toe ends (indicated by outlines 500c, 500d) of both feet and R' is the total weight detected by the subsensors in sensor 222 corresponding to the heel ends (indicated by outlines 500e, 500f) of both feet. The parameter A may be defined as the average of foot angles 185a and 185b relative to the longitudinal axis 502 (FIG. 1b) of the skateboard and determined by controller 44 from the four loci of the centers of those stimulated subsensors in sensor 222 corresponding to the toes and heels of the forward and rearward feet. For example, a user might accelerate or brake the skateboard merely by varying his or her forward weight distribution (Q), the longitudinal separation between his or her feet (d), the weight distribution from toe to heel imposed by each foot (QF), or the angles of his or her feet (A) with respect to the longitudinal axis.

Figure 2:
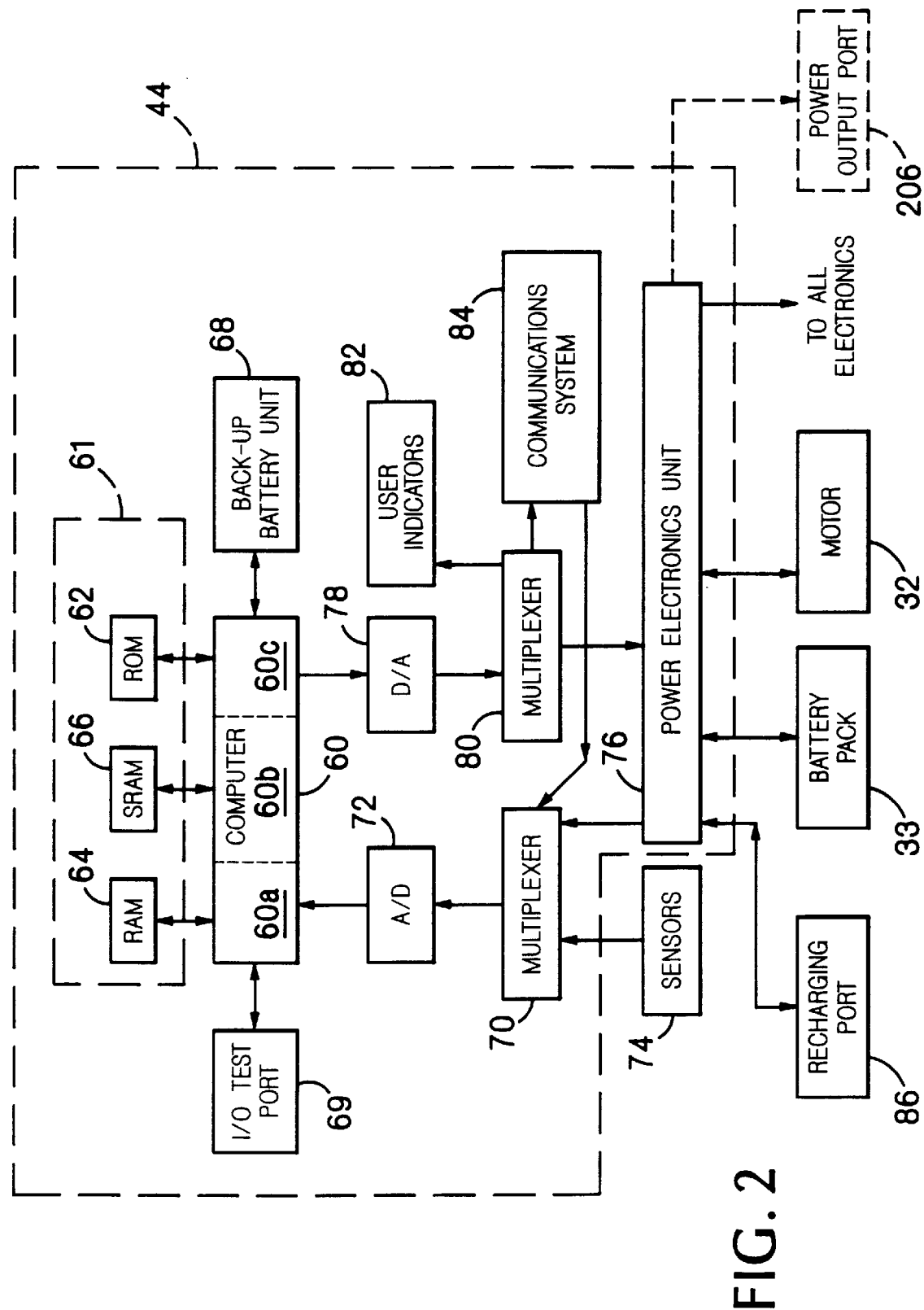
FIG. 2 is a block diagram representing electrical components of a controller and the interconnections between the controller's electrical components and other electrical components of the powered skateboard of FIGS. 1a, 1b, 1c.

Referring to FIG. 2, controller 44 includes a computer 60 connected to a memory 61 which includes nonvolatile Read Only Memory 62 (ROM) and volatile Random Access Memory 64 (RAM) and Static RAM 66 (SRAM). Computer 60 includes a central processing unit 60a, a clock 60b, and other electronic components 60c to provide total computer functionality. Through Input/Output (I/O) port 69, computer 60 is connected to an external I/O bus (for example, Small Computer System Interconnect, SCSI, not shown). Through I/O port 69 and computer 60, computer programs stored in memory 61 for execution by the central processing unit of computer 60 are monitored, tested, and modified. Computer 60 is also directly connected to a back-up battery power unit 68 which provides computer 60 with power to enable computer operation if battery pack 33 fails or in the temporary absence of battery pack 33. Back-up battery power unit 68 has a normal life of many years.

Through a multiplexer 70, an Analog to Digital (A/D) converter 72 receives analog signals from either power electronics unit 76, user sensors 74, or a communication system 84. A/D converter 72 converts these analog signals into digital signals before sending them to computer 60. Power electronics unit 76 receives signals from motor sensors (not shown) within motor 32, including various temperature and voltage sensors (not shown), indicating motor status and transmits these signals through multiplexer 70 and A/D converter 72 to computer 60. User sensors 74 include the pressure sensors (50, 54, 56, FIG. 1a) described above, as well as, a mode switch 93 (FIGS. 1a, 3).

Computer 60 sends digital signals to a Digital to Analog (D/A) converter 78 which converts the digital signals to analog signals before sending them through a multiplexer 80 to power electronics unit 76, user indicators 82, or communication system 84. Power electronics unit 76 sends the signals received from multiplexer 80 to motor 32 to control the operation of motor 32. User indicators 82 convey information to the user and include small flashing lights for indicating proper or improper skateboard operation and acoustic beepers for indicating mode changes, range remaining with current battery power, and excess speed. Communications system 84 sends information to and receives information from (that is communicates with) a corresponding external communication system (not shown). The corresponding communication systems share motor 32 status, security, and other mode change information to permit improved user control. These communications can occur over telephone lines to permit remote skateboard diagnostics and controller software revisions. They can also link to user hand-held finger controls for the skateboard.

Power electronics unit 76 receives electrical power from battery pack 33 and disburses electrical power to all electronics coupled to the skateboard. Battery pack 33 preferably includes rechargeable batteries which do not have to be replaced as often as non-rechargeable batteries. A recharging port 86, typically configured to connect either to a standard wall outlet or to a standard external battery charger, is electrically connected to power electronics unit 76. When recharging port 86 is connected to an external power source or when the skateboard is being electrically braked while the user propels the skateboard, power electronics unit 76 recharges the batteries in battery pack 33.

Figure 3:
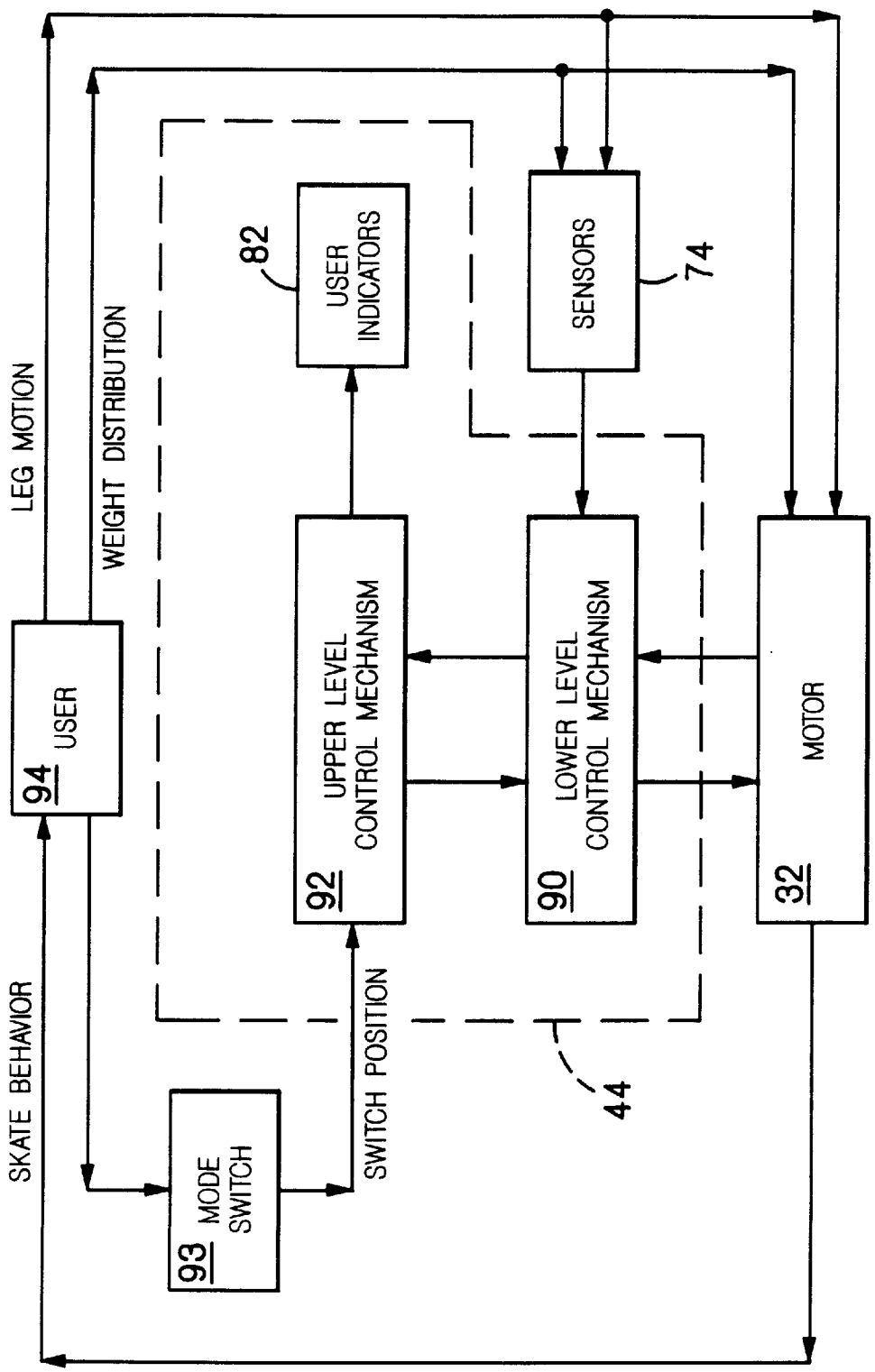
FIG. 3 is a block diagram representing interconnections between functional components, including an upper and a lower level control mechanism, of the powered skateboard of FIGS. 1a, 1b, 1c.

Referring to FIG. 3, controller 44 includes a lower level control mechanism 90 that sends and receives signals to and from motor 32 and measures (or accurately estimates) the actual motor torque (T), motor angular velocity ($\omega$), and change in motor angular velocity ($\delta\omega/\delta t$), as well as the temperature of motor 32, power electronics unit 76, and battery pack 33. Lower level control mechanism 90 then sends this information to an upper level control mechanism 92 also within controller 44. With this information, as well as, an input from mode switch 93 indicating skateboarding mode and a vector "a" consisting of a set of coefficients ($a_1$, $a_2$, $a_3$, $a_4$, $a_5$ . . . ), upper level control mechanism 92 calculates a target torque (T*), a target motor angular velocity ($\omega^*$), and a target braking rate ($\delta\omega/\delta t$)* (in other words, target change in motor angular velocity with respect to time; acceleration). Upper level control mechanism 92 then sends this data to lower level control mechanism 90 and indicates which of these values will control the operation of lower level control mechanism for a next predetermined time period (that is clock cycle). This data provides the parameters which determine the operation of lower level control mechanism 90 and, therefore, the operation of motor 32.

In lower level control mechanism 90, the desired motor current in an excited winding is i(t)* and it is determined as explained later in reference to FIG. 5. For purposes of discussion, a simplified alternative definition of i(t)* is i(t)*=$I_{max}T^*/T_{max}$, provided that the magnitude of i(t)* never exceeds $I_{max}$; when the magnitude of T* exceeds $T_{max}$, i(t)*=$I_{max}\text{sgn}(T^*)$ $T_{max}$ is the maximum torque and equals:

$$T_{max}=a_1$$

where $a_1$ depends on-motor and motor drive capabilities, and $I_{max}$ is the maximum current and equals:

$$I_{max}=a_4,$$

and $a_4$ is determined as a declining function of motor and power electronics temperatures, to prevent overheating. In addition, in this simplified alternative definition for i(t)*, the desired torque is $$T^*=a_1(1-\exp(-a_2(\omega^*-\omega)-a_3(\delta\omega/\delta t)^*))\text{sgn}(\omega^*-\omega).$$

Here $a_2$ and $a_3$ are mode dependent. These modes are described later. For Mode 3, the term $a_3(\delta\omega/\delta t)$ would generally be zero, and for Modes 4, 5, 6, and 7 the relative values of $a_2$ and $a_3$ can be selected by the manufacturer or user to provide the desired responsiveness of these modes. Through mode switch 93, the user selects one of seven operational modes, including: Mode 1, a wheels-locked mode; Mode 2, a normal skateboarding mode; Mode 3, a velocity maintenance mode; Mode 4, a leg-weight-distribution sensitive, directed power mode; Mode 5, a foot-position sensitive, directed power mode; Mode 6, a foot-weight-distribution sensitive, directed power mode; and Mode 7, a foot-angle sensitive, directed power mode. In the wheels-locked mode, the wheels are prevented from moving with a mechanical lock 95 by wires 95a which are slid into spoke-like indentations (not shown) on each freely rotating wheel 12a, 12b, 12d. Wires 95a (FIGS. 1a, 1c) slide within rigid guide-tubes 95b, which are attached to battery pack 33, and are advanced and retracted by the user through a finger-actuated sliding brake switch 95c. Alternatively, finger switch 95c can be replaced by braking motor 600 (FIG. 1c) which slides wires 95a within rigid guide-tubes 95b. Mode switch 93 and finger switch 95c can be combined into one switch. In the normal skateboarding mode, controller 44 sends electrical signals to motor 32 to cause motor 32 to compensate for motor and drive train friction such that the skateboard responds to the user's skateboarding motions in substantially the same way as an unpowered skateboard, and in the velocity maintenance mode, controller 44 sends electrical signals to motor 32 to cause motor 32 to maintain the wheel velocity established immediately after the user's full weight was last imposed on the skateboard. In Mode 4, the leg-weight sensitive, directed power mode, controller 44 sends electrical signals to motor 32 to cause motor 32 to accelerate and decelerate the driven wheels in response to the user's forward or rearward weight distribution (weight sensors 54, 56, FIG. 1a). In Mode 5, the foot-position sensitive, directed power mode, controller 44 sends electrical signals to motor 32 to cause motor 32 to accelerate and decelerate the rear wheels in response to the absolute and relative positions of the user's feet on the skateboard. Similarly, in Mode 6, the foot-weight-distribution sensitive, directed power mode, controller 44 sends electrical signals to motor 32 to cause motor 32 to accelerate and decelerate the driven wheel in response to the relative weights placed upon the heel or toe of at least one of the user's feet, and in the foot-angle sensitive, directed power mode, controller 44 sends electrical signals to motor 32 to cause motor 32 to accelerate and decelerate the driven wheel in response to the absolute and relative angles of one or both of the user's feet relative to the longitudinal axis of the skateboard.

The position of mode switch 93 is received by upper level control mechanism 92. Referring to FIG. 4, upper level control mechanism 92 periodically determines (step 100) if switch 93 has been moved into positions corresponding to Modes 2, 3, 4, 5, 6, or 7 (that is, switched out of Mode 1). If not, then upper level control mechanism 92 remains in an off state (step 102). In the off state 102 only negligible power is consumed to maintain the clock 60b (FIG. 2), and RAM 64 and SRAM 66 within memory 61 of computer 60. When switch 93 is moved to positions corresponding to Modes 2, 3, 4, 5, 6, or 7 upper level control mechanism 92 first establishes (step 104) Mode 1 parameters, including setting the brakes and setting the target angular velocity $\omega^*$ of the motor to zero or to a maximum value near zero, to prevent the skateboard from rolling until signaled by the user. The mechanical wheel lock 95 (FIG. 1c) discussed above is linked to mode switch 93 so that when switch 93 is moved from the off state to Modes 2, 3, 4, 5, 6, or 7 locking wires 95a are extracted from the wheels 12a, 12b, and 12d, allowing them to freely rotate.

Upper level control mechanism 92 then determines if the user has exited Mode 1 (step 106) by executing a prescribed sequence of motions detected by lower level control mechanism 90 (FIG. 3). For example, the user might be required to unweight the skateboard for a period between one and three seconds, followed within two seconds by a forceful attempt to move the skateboard backward and then forward while imposing significant weight on the skateboard. The lower level control mechanism detects an unweighted skateboard through signals from weight distribution sensors 54, 56 (FIG. 1a) or by the loss of any road resistance (detected by computerized attempts to perturb the motor shaft angle, since if the wheel is lifted or supports only the skateboard, very little torque is required to rotate the wheels). The forced backward and forward motion is detected, for example, by virtue of the voltages induced on the motor windings or by changes in a shaft encoder 160 (FIG. 5), described below.

When upper level control mechanism 92 detects the Mode 1 exit sequence, it sets (step 108) vector parameters $b_i$ (i=1, 2, . . . , $b_{max}$) to predetermined values that correspond to the position of mode switch 93 (Mode 2, 3, 4, 5, 6, or 7).

Next the value of the braking parameter B is tested (step 120) against threshold $b_5$ in step 120. The braking parameter B may be the pressure indicated by heel brake sensor 50 (FIG. 1a). If B>$b_5$, then upper level control mechanism 92 sends (step 122) a target acceleration, $a^*$, having a value of $-Bb_6$ or $-b_9$, whichever yields the lesser braking torque and again, the braking parameter is tested (step 120). If no braking requests are detected, that is, braking parameter B is not greater than $b_5$ (step 120), then upper level control mechanism 92 determines (step 124) if the total weight on the skateboard, W, has exceeded threshold $b_2$ for a time $\Delta t$ more than $b_4$ seconds, for example, 0.2 seconds, the time required for the velocity of a newly accelerated and weighted skateboard to reach equilibrium as the user regains balance.

If in step 124 the requisite $b_4$ seconds have passed with weight W over threshold $b_2$, then upper level control mechanism 92 compares (step 126) motor angular velocity, $\omega$, to a speed limit $\omega$LIMIT, defined by $b_{12}$. If that limit is not exceeded, then upper level control mechanism 92 sets (step 128, the major speed setting step) the skateboard speed. First, the target motor angular acceleration, $a^*$ is set in accordance with the directed power modes 4, 5, 6, or 7 as determined by the coefficients $b_{13}$–$b_{max}$ (FIG. 4b, described below) and by the $b_{10}$-second average values of the parameters Q, d, QF, and A. These $b_{10}$-second averages are understood to be arithmetic averages or median values, or related average measures. Second, the target motor angular velocity $\omega^*$ is set to be the sum of the last value for $\omega_L$ and the integral of the observed skateboard accelerations, a(t), experienced since the time, $t_L$, of the last establishment of $\omega_L$. The sum of the last value for $\omega_L$ is initially set in step 104 as zero-and later set in step 134. Again, the braking parameter is tested (step 120).

If in step 124 the requisite $b_4$ seconds have not passed with weight W over threshold $b_2$, then upper level control mechanism 92 determines (step 112) by means of proximity or weight sensor 222 whether the user has a foot on the skateboard. If there is no foot present, the skateboard is presumed to be loose and Mode 1 parameters are reestablished by upper level control mechanism 92 in step 104. Upper level control mechanism 92 notifies the user of a return to Mode 1 with an acoustic beep from an acoustic beeper in user indicators 82 (FIG. 3). If the user is found in step 112 to have a foot on the skateboard, then upper level control mechanism 92 (step 134) sets the target motor torque T* to zero, resets the parameter $\omega_L$ to the current motor angular velocity $\omega$, and resets the parameter $t_L$ to the current time t; and, again, tests the braking parameter (step 120).

If the speed limit $b_{12}$ is exceeded (step 126), then upper level control mechanism 92 causes (step 130) an acoustic beeper within user indicators 82 to generate an acoustic beep every $b_8$ seconds to notify the user that skateboard velocity is above the speed limit. Upper level control mechanism 92 also sends (step 132) a target deceleration $a^*$ value to lower level control mechanism 90 to cause the lower level control mechanism to send electrical signals to motor 32 to slow the skateboard in proportion to the degree to which the speed limit is exceeded. If the requisite $b_4$ seconds (step 124) have not yet elapsed before a new target motor angular velocity, $\omega^*$, can be established, and a user's foot remains (step 112) on the skateboard, then upper level control mechanism 92 (step 134) continues the target torque T* value at zero and updates $t_L$=t and $\omega_L$=$\omega$.

Upper level control mechanism 92 flows through some subset of the above described steps 120–140 in less than a few milliseconds even though the target angular velocity, $\omega^*$, and target torque, T*, are typically altered relatively infrequently, for example, at intervals of 10–200 milliseconds.

Figure 4A:
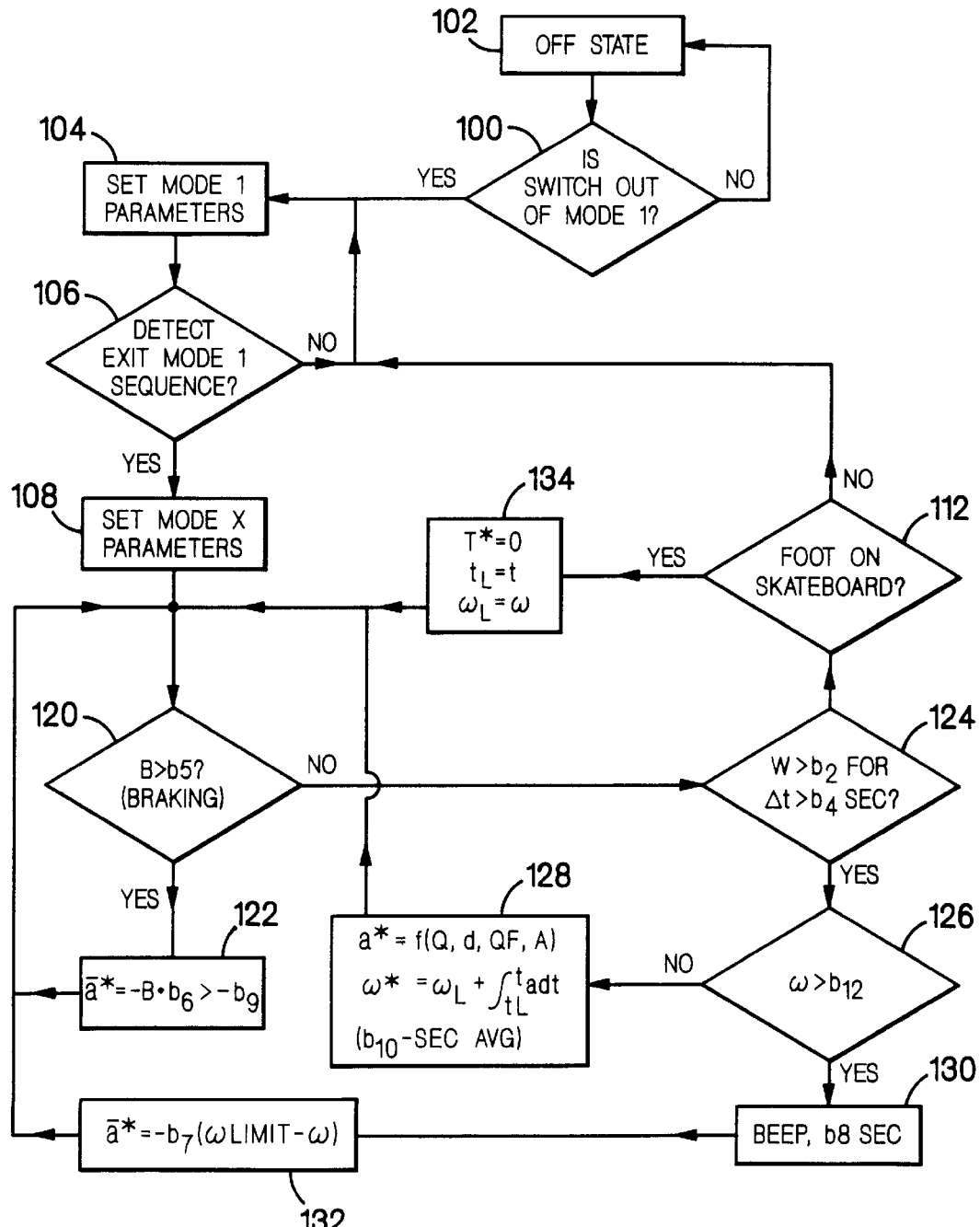
FIG. 4a is flow chart representing the operation of the upper level control mechanism of FIG. 3.
Figure 4B:
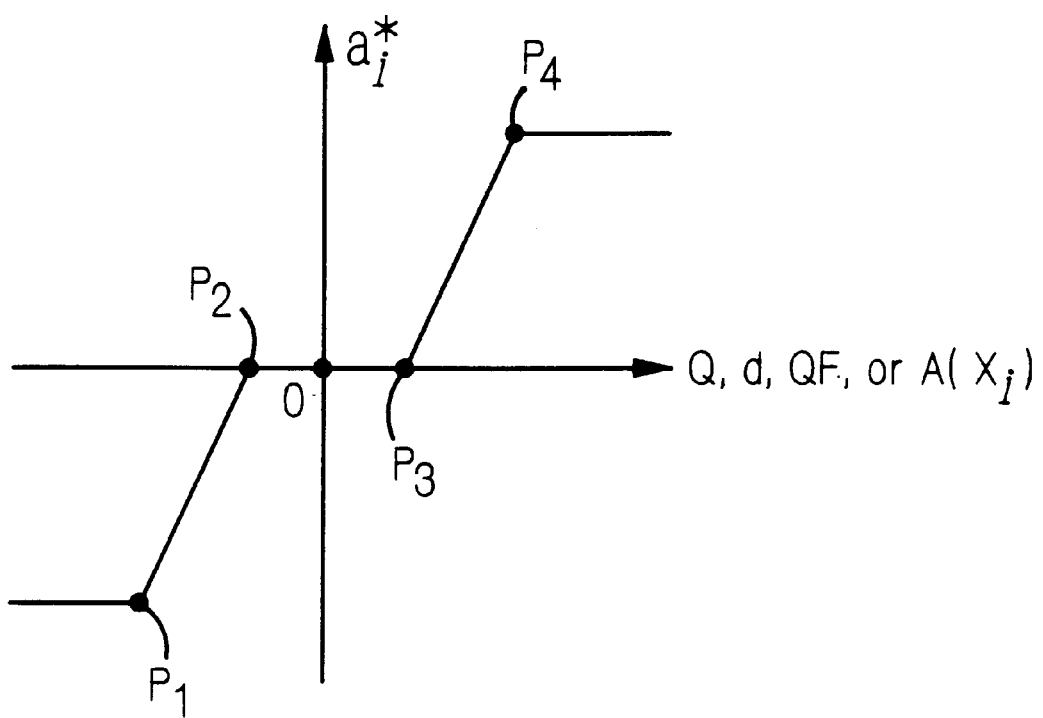
FIG. 4b is a graph displaying the relationship between the desired skateboard acceleration a* and measured parameters Q, d, QF, and A.

Referring to FIG. 4b, the relationship between the target motor angular acceleration $a^*$ and measured parameters Q, d, QF, and A required in step 128 of FIG. 4a is defined as $a^*=a_1^*+a_2^*+a_3^*+a_4^*$, where the subscripts 1, 2, 3, and 4 are associated with the contributions controlled by measured parameters Q, d, QF, and A, respectively, also designated $X_i$. The general dependence of $a_i^*$ on its corresponding measured parameter Q, d, QF, or A is, in one embodiment, defined by four points $P_{i1}$, $P_{i2}$, $P_{i3}$, and $P_{i4}$, each point being characterized by two coefficients defining its location in the plane $a_i^*$ $X_i$ illustrated in FIG. 4b. A total of eight coefficients, therefore, characterize the dependence of $a_i^*$ upon each of Q, d, AF, and A. Thus, for the 4-point rules of FIG. 4b, a total of 32 coefficients are required to relate $a^*$ to the measured parameters Q, d, QF, and A; these are designated $b_{13}$–$b_{45}$. The 4-point rule illustrated in FIG. 4b defines $a_i^*$ as being related to $X_i$ by a rule characterized by 5 straight-line segments meeting at the points $P_{ij}$ ($j$=1–4) and having zero, or nearly zero, marginal dependence upon $X_i$ within three of those straight-line segments. These coefficients $b_{13}$–$b_{45}$ can be selected so that each of the modes 4, 5, 6, and 7 are pure; that is, the coefficients b are defined so that $a_i^*$ is non-zero for only that value of i corresponding to the pure mode 4, 5, 6, or 7. More generally, the coefficients $b_{13}$–$b_{45}$ can be defined so that the modes 4, 5, 6, and 7 exhibit combined behavior that merely accentuates the behavior associated with the selected mode. For example, a combination of modes 4, 5, and 6 could exhibit braking behavior if any of the deceleration signals were detected, including excessive weight on the rear of the skateboard, foot position over the designated braking positions, or excessive weight on at least one of the user's heels relative to the corresponding toes. This combination might emphasize Mode 5 by being most sensitive to foot position, but by still responding to exceptional braking signals of the other two types associated with Modes 4 and 6.

Figure 5A:
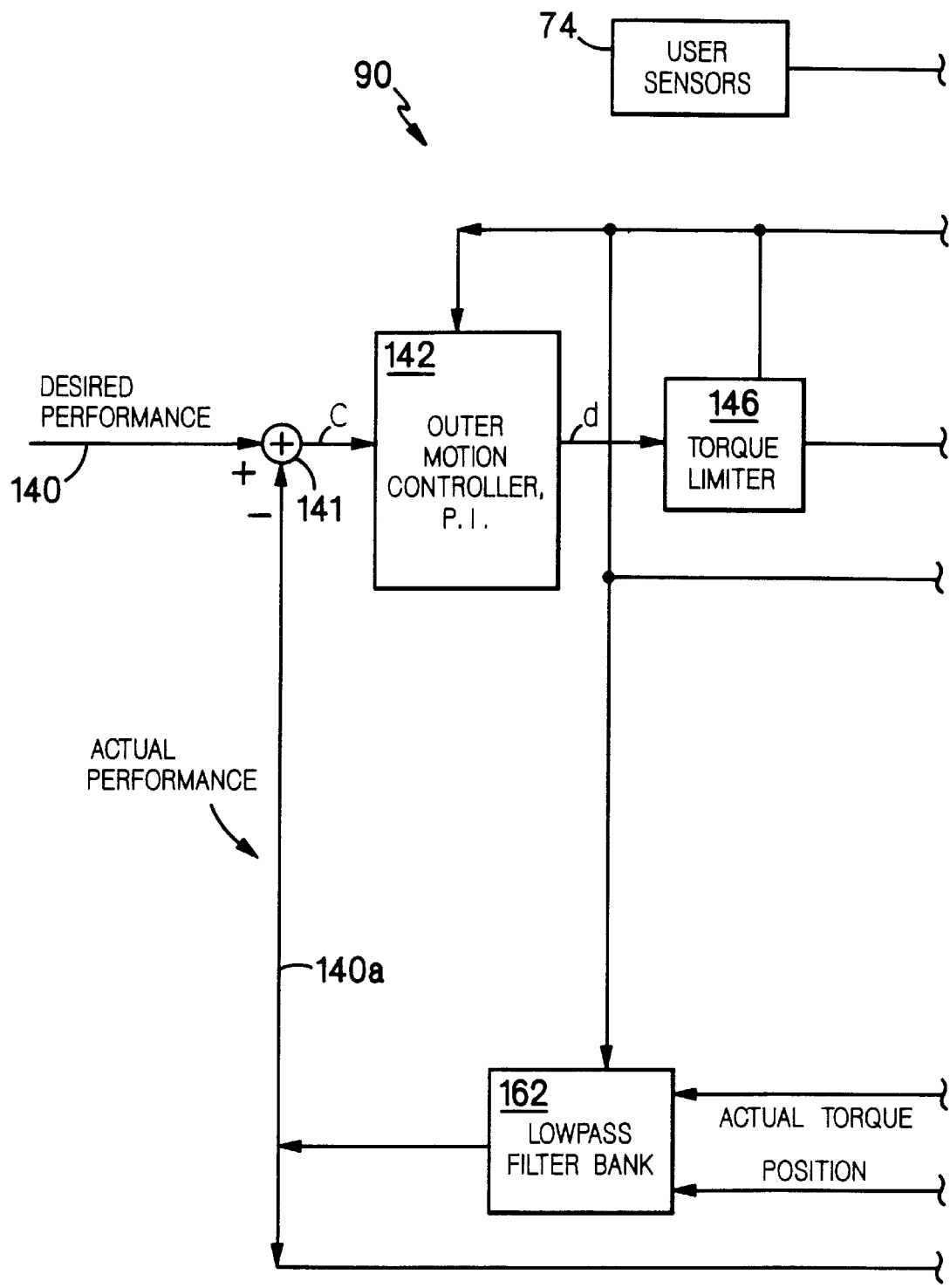
FIGS. 5a and 5b illustrate a block diagram of the interconnections between the electrical components of the lower level control mechanism of FIG. 3.
Figure 5B:
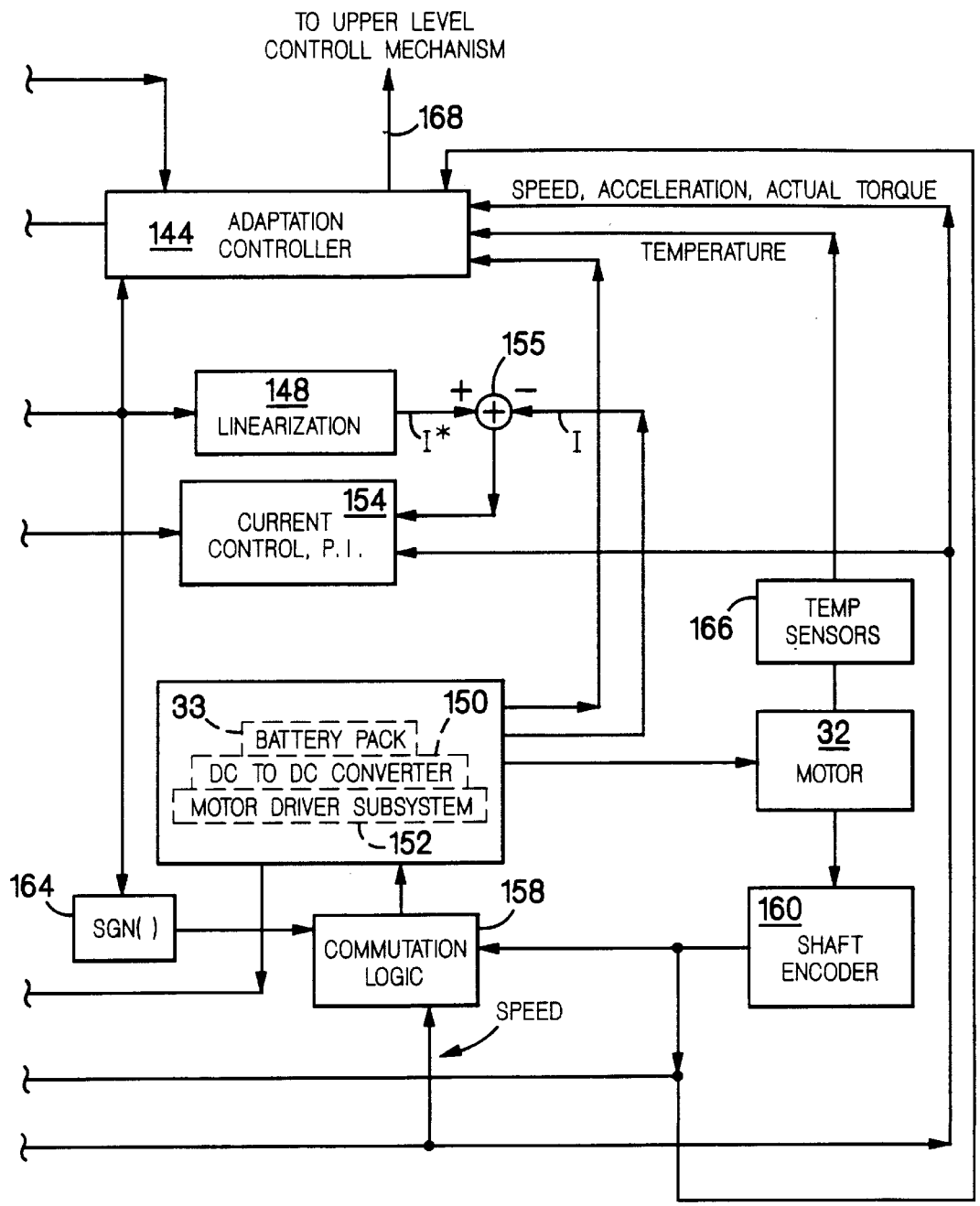

Referring to FIG. 5, lower level control mechanism 90 receives values for the desired (that is, target) angular velocity, $\omega^*$, torque, $T^*$, and acceleration, $a^*$ or its equivalent $(\delta\omega/\delta t)^*$, from upper level control mechanism 92 over lines 140, subtracts with a subtractor 141 the desired values from estimates or measurements of actual angular velocity, $\omega$, torque, T, and acceleration, a or its equivalent $(\delta\omega/\delta t)$, over lines 140a, and causes the motor to respond to any difference between the two sets of data to bring the actual values toward the desired values. From subtractor 141, an outer motion proportional-integral (PI) controller 142 receives a velocity error, c, equal to the difference between the desired and the actual motor angular velocity. Outer motion PI controller 142 tracks this difference as a function of time and creates a desired torque, $T^*$, output, d, where $$d = K_p c + K_i \int (c \delta t)].$$

An adaptation controller 144 provides an integrator (not shown) within the outer motion PI controller 142 with a constant $K_p$, which is proportional to the gain in the velocity error c, with a constant $K_i$, which is proportional to the integral of the velocity error c, and with an anti-windup limit. The anti-windup limit is a threshold, and if c exceeds this threshold, the integrator stops integrating (that is, the integrator is clamped).

The output d of outer motion PI controller 142 is passed through a torque limiter 146 which clips the torque signal when it exceeds a (reasonable) threshold set by adaptation controller 144. Adaptation controller 144 derives this threshold from the temperature and speed of the motor, as well as, the state of the charge of battery pack 33. The output of torque limiter 146 is linearized by a linearizer 148 (that is, linearizer 148 cancels any non-linearity in the relation between motor torque and current). The specific function used by the linearizer is matched to the motor and adjusted by adaptation controller 144 in response to motor variations. The adaptation controller 144 periodically adjusts linearizer 148 in accordance with motor temperature. The output of linearizer 148 is the desired level of current, $I^*$, needed by motor 32 to generate the desired torque, $T^*$.

The actual level of current, I, available from battery pack 33, dc-to-dc converter 150, and motor driver subsystem 152 is then compared to the desired level of current, $I^*$, by a subtractor 155, and the difference is then sent to current proportional-integral (PI) controller 154. As in the case of outer motion PI controller 142, adaptation controller 144 provides $K_p$, $K_i$, and an anti-windup limit to an integrator (not shown) within current PI controller 154. The output of current PI controller 154 is sent to and controls dc-to-dc converter 150, and, therefore, controls the current in motor driver subsystem 152, and, hence, the torque of motor 32.

Motor driver subsystem 152 is also controlled by commutation logic 158 which receives signals from shaft encoder 160, a lowpass filter bank 162, and a signum function 164. The signum function provides commutation logic 158 with information regarding the sign of the desired torque, $T^*$, while shaft encoder 160 provides commutation logic 158 with the actual position of motor 32. Lowpass filter bank 162 provides commutation logic 158 with the actual speed of motor 32. This information allows commutation logic 158 to properly drive, using motor driver subsystem 152, the three phases of motor 32. Shaft encoder 160 also provides adaptation controller 144 and lowpass filter bank 162 with the position of motor 32. Lowpass filter bank 162 uses the position of motor 32 to estimate the speed of motor 32 and filters the position of motor 32 and the actual torque to produce smoothed estimates of the position, speed, acceleration, and torque of motor 32. The new desired performance characteristics (in other words, torque, angular velocity, and acceleration) are then subtracted in the next clock cycle, by subtractor 141, from the actual performance estimates.

Adaptation controller 144 controls the functionality of the entire lower level control mechanism 90 by taking the estimates of the actual motor torque, position, acceleration, and battery charge, as well as, the output of user sensors 74 and temperature sensors 166, and appropriately controlling torque limiter 146, linearizer 148, lowpass filter bank 162, and PI controllers 142, 154. The appropriate control of these systems adjusts the mechanism to account for motor and battery variations due to thermal change, mechanical load, and manufacturing variations. The adaptation controller implements both the speed limit and the change in skateboarding modes. Adaptation controller 144 also adjusts the other controllers using, for example, gain scheduling for a given set of estimated motor, battery, and load parameters. Additionally, adaptation controller 144 sends the actual motor torque, acceleration, and velocity data to upper level control mechanism through lines 168.

Figure 6:
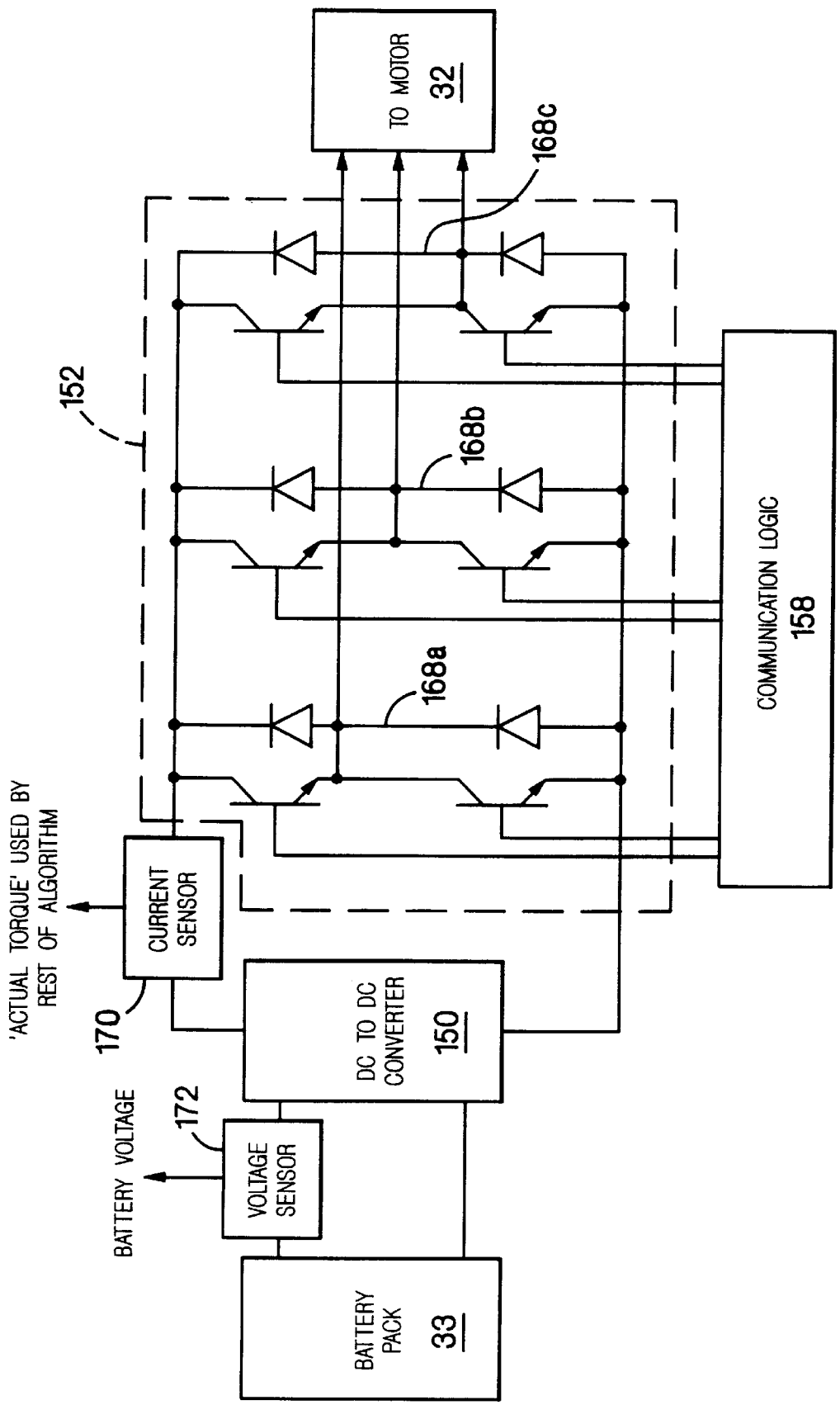
FIG. 6 is a more detailed block diagram of the interconnections between the battery pack, dc-to-dc converter, and motor driver subsystem of FIG. 5.

Referring to FIG. 6, battery pack 33 provides the power to drive motor 32 through dc-to-dc converter 150, for example, a voltage to current converter. Through appropriate manipulation of the current conversion ratio by the adaptation controller, dc-to-dc converter 150 controls the amount of current passing through drive circuits 168a, 168b, and 168c in motor driver subsystem 152. Current sensor 170 provides lower level control mechanism 90 with an estimate of motor torque by providing an estimate of the current passing through the motor. Since torque is equal to $K_{torque}I$, where I is the current delivered to the motor through the current sensor and $K_{torque}$ is a known constant generally dependent upon motor temperature, this measurement provides an accurate estimate of motor torque, T. In addition, since the conversion ratio used by dc-to-dc converter 150 in any cycle is known, this measurement of current sensor 170 also provides adaptation controller 144 with an accurate estimate of the current available from battery pack 33. Voltage sensor 172 provides adaptation controller 144 with a direct measurement of battery pack 33 voltage.

To operate brushless, permanent magnet motor 32, drive circuits 168a, 168b, and 168c send electric pulses to motor 32 which are synchronous to the position (that is, timing) of motor 32. As described above, the position is determined by shaft encoder 160 (FIG. 5) and using this information commutation logic 158 drives drive circuits 168*a*, 168*b*, and 168*c* to provide accurately timed electric pulses to motor 32. In-depth discussions on the proper operation of motors can be found in W. Leonhard's *Control of Electrical Drives* (Springer-Verlag 1985, Berlin, Germany) and B. K. Bose's *Power Electronics and AC Drives* (Prentice Hall 1986, Englewood Cliffs, N.J.), which are incorporated herein, in their entirety, by reference.

Temperature sensors 166 (FIG. 5) include a motor temperature sensor, a power electronics temperature sensor, a battery pack temperature sensor, and an outside (that is, environmental) temperature sensor. If the motor, the power electronics, or the battery pack become too hot, they can become damaged and fail. Similarly, the motor can fail if the permanent magnets are too cold.

The adaptation controller notifies upper level control mechanism 92 of impending failure conditions, such as rising or falling temperatures, and upper level control mechanism notifies the user through user indicators 82.

An important feature of skateboard 10 (FIG. 1*a*) is the acceleration and braking of the skateboard in a user-responsive hands-off manner through computer-control of motor 32 using real-time data from sensors. The user's weight, weight distribution, and position on the skateboard, in combination with skateboard orientation, history, and real-time motor speed, torque, and acceleration, largely determine proportional skateboard acceleration and braking. Above, seven control modes were identified. In Mode 1, the wheels are locked mechanically or by motor control and the skateboard remains stationary. In Mode 2, controller 44 causes motor 32 to drive the wheels with a torque equal to the motor resistance to compensate for motor friction, where motor resistance equals the amount of torque required to turn the wheels when the skateboard is lifted from the road surface. Also in Mode 2, controller 44 can protect against unintended backwards motion by having the motor apply a forward torque to the rear wheels to counter any reverse torque or by providing a mechanical ratchet action. This mode can also be combined with various braking options.

In Mode 3, the principal signals controlling skateboard acceleration and deceleration are derived from motor velocity, torque, and load. These signals are then interpreted in conjunction with the recent history of the user's weight distribution on the foot support as determined by weight distribution sensors 54, 56, and possibly sensor 222 (FIGS. 1*a*, 1*b*). There are many variations of the preferred embodiment, several of which are described below.

One preferred embodiment of Mode 3 generally sets motor torque to maintain the skateboard velocity established when the user's full weight was last imposed upon the skateboard, an event evident from the sudden transition from a partially unweighted state to one of significant weight being placed on the skateboard. The user's weight is determined by recent weight data, where the minimum and maximum of smoothed data from the weight distribution sensors are used to refine limits (zero and maximum weight) determined over a longer period of time.

Upper level control mechanism 92 (FIG. 3) sets the target motor angular velocity, $\omega^*$, of the skateboard equal to the estimated actual velocity, $\omega$, observed during the previous torqueless phase t=0.2 seconds after the observed skateboard loading, $\omega$=F+R, exceeds 0.6 times the user's maximum skateboard weight $W_{max}$. The torqueless phase is initiated whenever $\omega$ falls below 0.4 times $W_{max}$ for more than t=0.2 seconds. Values of the parameters $T^*$, $W_{max}$, $\omega$, and t are varied to provide the most natural and desired user response characteristics. Skateboard loading $\omega$ is determined by weight distribution sensors 54, 56 (FIG. 1*a*). Another embodiment of controller 44 initiates and terminates the torque-less phase based not upon skateboard loading $\omega$, but upon skateboard and user inertial braking observed when the motor is dithered about a level and at a high frequency imperceptible to the user; detected high inertia is approximately equivalent to observing values of $\omega$ above 0.6 times $W_{max}$ in the first preferred embodiment.

To help protect skateboarders from falls in Mode 3, skateboard velocity is diminished by proportional electronic braking when the user's relative weight distribution on the forward or rearward portion of the skateboard drops below a first threshold or rises above a second threshold (Mode 4), respectively, or if subsensors within sensor 222 indicate a foot position with an above-threshold separation between the user's two feet (Mode 5), or subsensors within sensor 222 indicate above-threshold values for the relative weight placed on the user's heels relative to the user's toes (Mode 6), or subsensors within sensor 222 indicate an angle A between the user's feet and the longitudinal axis of the skateboard which corresponds to braking (Mode 7), or if an orientation sensor 173 (FIG. 1*a*), for example a mercury switch, indicates that the skateboard has shifted (that is, tilted) beyond a fourth threshold. For example, a foot angle indicating braking might be defined as the angle 184*a* (FIG. 1*b*) when it is less than a defined threshold, perhaps 30°. Braking arises either from reverse (resisting) torque applied to at least one of the wheels of the skateboard by the motor or from pressure applied to the wheels by disk brakes or similar means.

Mode 3 permits users to maintain their skateboarding speed and even accelerate naturally without swinging their legs to the side as they repeatedly step off the board with one foot to propel it forward. Avoiding the need for lateral foot movement is a significant safety feature in crowded environments. That is, the skateboard generally maintains speed, permitting the skateboarder to accelerate or decelerate by controlling the velocity of the skateboard so that it remains as it was when the user's weight was last fully imposed upon it. For example, to decelerate, the skateboarder can step partly off and slow the skateboard with the one remaining foot before stepping fully back on it.

To prevent small triggering motions from spontaneously accelerating resting skateboards (in other words, the user is standing still), the skateboard can be automatically braked whenever the skateboarder steps completely off or stops moving for more than a predetermined time, such as three seconds. Restarting and releasing the locked wheels can be initiated by a variety of skateboard commands, such as stepping off and immediately back on before pushing the skateboard forward. After the first step the skateboarder might coast forward before taking a second step to accelerate further. The skateboarder can simply coast at roughly constant speed or change speed and direction by pushing the skateboard forward or backward appropriately using one foot on the ground, or by engaging skid or other brakes as suggested above. In effect, Mode 3 resembles standing on a moving beltway, the speed of which is controlled primarily by the average skateboard speed when the user's weight was last fully placed upon the skateboard after the weight on the skateboard was below some threshold (that is, largely unweighted; the user stepped partly off).

In its simplest form, acceleration for Mode 4 increases partly in proportion to the percentage of the weight placed forward on the skateboard and deceleration begins when the weight distribution shifts backward. As a result the user can move forward in several modes. For example, Mode 3 behavior is obtained in Mode 4 simply by maintaining nearly uniform weighting fore and aft on the skateboard when stepping forward, or by disabling the directed-power modes (4, 5, 6, and 7) when the skateboard loading W falls to half of $W_{max}$. Hence, Mode 4 behavior can be overlaid on Mode 3 behavior, by a user who deliberately controls his or her weight distribution while in Mode 4. Alternatively, Mode 4 acceleration can be determined by weight distributions alone and not by the velocity established when the user last stepped fully aboard, thus, precluding simultaneous Mode 3 and Mode 4 response characteristics. Other mixes of Mode 3 and Mode 4 behavior are possible. In effect Mode 4 resembles standing on a moving beltway, the velocity or acceleration (or some combination thereof) of which is controlled primarily by the average forward centering of the user's weight on the skateboard. Similar to Mode 3, Mode 4 permits users to maintain their skateboarding speed and even accelerate naturally without swinging their legs to the side.

A user in Mode 4 moves forward by leaning forward and backward to signal the desired degree of acceleration (or velocity or combination of velocity and acceleration), as indicated by the chosen values of the constants $a_2$, $a_3$ and $b_6$, and the four points $P_i$ (FIG. 4b) associated with $a^*_i$ and $x_i$. Controller 44 (FIG. 1a) can control motor 32 in response to various combinations of total weight on the skateboard, weight distribution, and recent skateboard velocity and torque history to permit the skateboard to balance the user as an inverted pendulum on short time scales (fractions of a second), while still permitting the user to shift his or her weight to control average speed or acceleration on slightly longer time scales of a second or more. The degree to which user balance impacts user response characteristics is a matter of user choice, as is the speed limit for maximum rolling speed.

Figure 7:
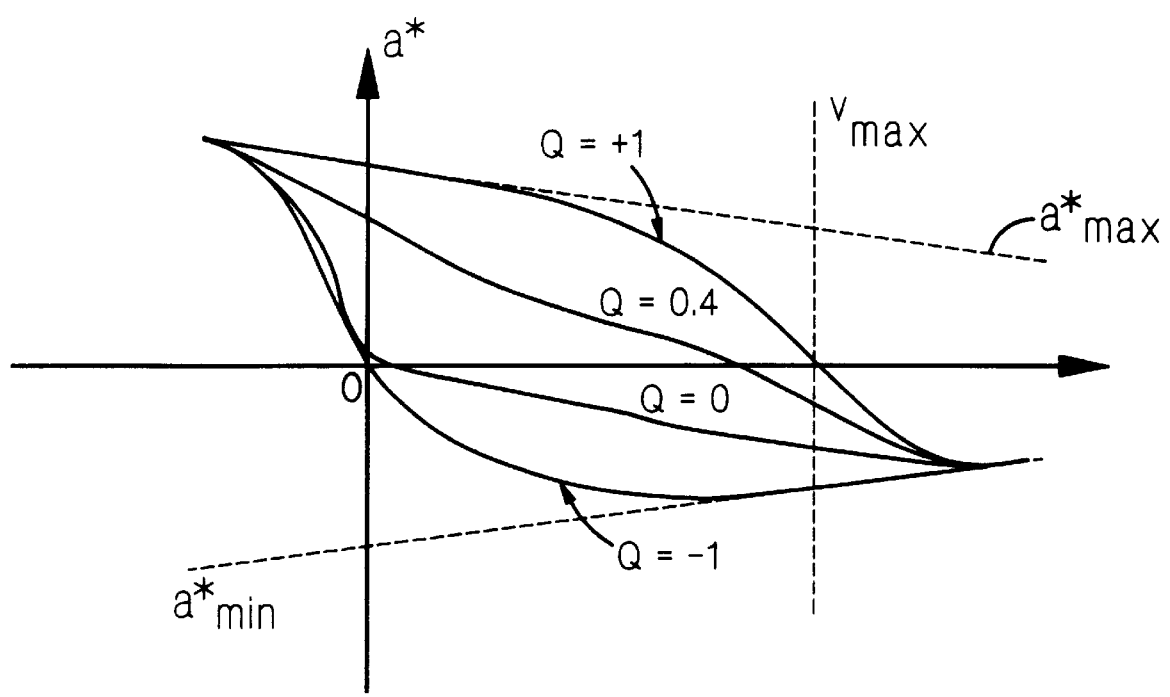
FIG. 7 is a graph representing an operational skateboard mode 4 control law.

Referring to FIG. 7, to characterize a particular Mode 4 control law (for example, a polynomial, piece-wise linear equation, or table look-up executed by controller 44, FIG. 3), a graph is used to relate the desired acceleration, $a^*$, (sent from upper level control mechanism 92 (FIG. 3) to lower level control mechanism 90) to the actual estimated skateboard velocity, v, and to a chosen "weight-forward" metric Q. As one example, $Q=(F-R)/(F+R)$, where F is the weight on forward weight distribution sensor 54 (FIG. 1a) and R is the weight on rearward weight distribution sensor 56. Hence, Q generally lies between the values of +1 and –1, assuming F and R are always positive. As shown, for any particular value of Q, the maximum allowed acceleration $a^*_{max}$ diminishes slightly with increasing velocity v to a minimum allowed negative acceleration $a^*_{min}$. Safety generally requires a decrease in the allowable acceleration as the skateboard velocity increases, and equipment considerations generally require a decrease in the allowable acceleration and motor current as the temperature of the motor or power electronics increases.

When the user's weight is maximally forward and Q=1, the maximum forward safe acceleration is possible if the skateboard velocity is negative. As the velocity increases to the speed limit $v_{max}$, however, the allowable acceleration diminishes to zero. For velocities beyond this speed limit, upper level control mechanism 92 sends lower level control mechanism 90 a negative acceleration command which causes motor 32 to apply reverse torque to the skateboard's rear axle to slow or brake the rear wheels. Similarly, if the skateboard is forced backward so that velocity, v, is negative, then forward acceleration results which again brakes the skateboard. The control law can be modified to reflect the skill of the user or road condition (typically $v_{max}$ and $a^*_{max}$ are varied). For example, $v_{max}$ might be temporarily reduced if the torque history of the motor is excessively erratic, indicating a poor road surface or unstable user, and $a^*_{max}$ might be temporarily reduced if the velocity or torque history of the motor becomes unusually erratic following larger accelerations. In addition, depending on a user's skill or preferences, when the skateboard is stationary or moving at slow speeds, more forward weight might be required to move or accelerate it, to help avoid accidents from unexpected or unnoticed forward motion. This can be accomplished by a non-linear relationship between Q, for example, and $a^*$ where the relation has a dead-band in the middle of its range where a is nearly zero; more erratic skateboarding could be followed by an expansion of this dead-band.

The maximum allowed velocity $v_{max}$ may also be made dependant upon the total weight F and R, where $v_{max}$ goes to zero if F and R remain too long (perhaps 3 seconds) below some minimum threshold corresponding to an unloaded skateboard or to a child too small to use the device safely. Similarly, if F+R exceeds a maximum threshold, for example, 250 pounds, $v_{max}$ can be set to zero, for example, to avoid overloading the motor. To smooth the transitions to braking, $v_{max}$ is made a gradual function of F+R and involves sampling F+R over time so that only sustained weight improprieties induce stopping. Optionally, the speed limit $v_{max}$ is reduced when making turns, particularly sharp turns. The degree of a turn can be detected by a sensor on a steering mechanism, described below, or by an accelerometer.

OTHER EMBODIMENTS

Power Sources

Although motor 32 (FIG. 1a) was described as a battery-driven electric motor, other power sources can be used, including an internal combustion engine or an electric hybrid motor, provided the appropriate fuel supply is made available.

Power Transfer

Additionally, separate motors can be used to drive each of the wheels 12a, 12b, 12c, 12d (FIG. 1a) or to drive one forward wheel 12a, 12b and one rear wheel 12c, 12d or to drive forward axle 14 and rear axle 20. Alternatives to gears 38, 40 (FIG. 1a) can be employed including belts or hydraulic transmissions or a differential gear box (similar to an automobile). They may have a single gear ratio or multiple gear ratios which are switched manually or electrically by command from the controller.

Location of Skateboard Components

Instead of locating motor 32, battery-pack 33, and controller 44 under foot support 18, one or more of these components can be located elsewhere, such as above or to the side of the user's feet, or on the user, for example, the user's back.

Foot Restraining Mechanisms

Moreover, foot embracing mechanisms can be employed, including foot or ankle straps, flaps, or Velcro® fasteners.

Wheel Configurations

Although skateboard 10 (FIG. 1a) was described as having four wheels 12a, 12b, 12c, and 12d, different wheel configurations are possible, for example, a three wheeled configuration: one front wheel and two rear wheels; or one or two front wheels and one very wide (that is, about the width of the skateboard), centered rear wheel.

Suspension

Referring again to FIG. 1c, spring supports and shock absorbers for each of the wheels (only spring supports 194, 196 for wheels 12a, 12b are shown) function as suspension mechanisms to reduce the amount of vibration that reaches a user's feet when the wheels roll over rough road surfaces.

Component Protection

A sturdy case 202 can also be used (FIG. 1a) to surround motor 32, battery pack 33, controller 44, and gears 38, 40. Case 202 both seals the devices against environmental moisture and dirt and protects the devices against impact with road hazards (that is, rocks, curbs). The front slope 204 of the bottom of the case can also partially deflect the shock to the front wheels of collisions with obstacles like large cracks in the road. Placing small wheels (not shown) across this front wedge surface facilitates riding up over small obstacles without stalling motor 32. Generally, case 202 is removable to allow for periodic skateboard and component cleaning and lubrication.

Turning

Turning is typically accomplished while skateboarding by leaning left or right (that is, laterally) a sufficient distance. Front axle-support assembly 16 (FIGS. 1a and 1c) can be configured with a turning truck to respond to lateral weight distribution changes by turning the front wheels or wheel slightly in the desired direction. Such turning trucks are widely employed on skateboards. For safety reasons this angle is limited to small values at high speeds, for example, a few degrees. These passive steering mechanisms may be supplemented or replaced by motorized steering responsive, for example, to pressure sensor 222 (FIG. 1b) which includes subsensors that detect changes in a user's lateral weight distribution. The shape of the wheels may also passively influence steering as weight is adjusted laterally; e.g., a broad round-bottomed centrally located front wheel will turn the skateboard in the direction of the lean. These passive and active steering controls can also cause the rear wheels to turn.

Power Output Port

In addition to the external computer I/O port 69 (FIG. 2) and recharging port 86, an additional external power output port 206 may be provided for utilizing the skateboard's ability to generate a variety of power signals to drive external equipment for possibly unrelated purposes, for example, a light 207 (FIGS. 1a–1c).

Temperature

As an alternative to the various temperature sensors 166 (FIG. 5), temperature can be deduced from the operation of motor 32. Using the voltage applied to motor 32 as measured by voltage sensor 172 (FIG. 6) and the current applied to motor 32 as measured by current sensor 170, the resistance of the motor windings can be determined. Typically the motor windings are copper which has predetermined relationship between temperature and resistance. Thus, the temperature of the windings can be estimated when the resistance of the copper windings is known. The temperatures of critical electronic components can also be estimated from measurements of ambient temperatures supplemented by thermal models calculating the time-weighted effect of dissipated heat due to $I^2R$, where I is the current through the heated element and R is its electrical resistance. Similarly, the battery temperature can be estimated as a function of battery current over time.

Sensor Locations

The weight distribution sensors 54, 56 (FIG. 1a) can be located in a variety of positions, including, for example, on a top surface of foot support 18. Because the contour of the human foot varies from user to user, where simple one-element weight sensors are located on a top surface of the foot support, a flat, stiff plate should be mounted over each sensor between the sensor and the foot to insure an even distribution of weight. In addition to pressure sensors 50, 54, and 56 (FIG. 1a), sensor 222 can measure total weight-pressure. Skateboard orientation sensor 173 (FIG. 1a) can also be incorporated within skateboard 10 to permit the user to enter Mode 1 (step 104, FIG. 4a) when the user swings the skateboard up to carry it by handle 221 (FIGS. 1b, 1c). Thus, instead of a seven position mode switch 93 (FIGS. 1a, 3), a two position (off or on) switch may be employed or no switch, and the user can signal which mode he or she wants to be in through a predetermined series of skateboard motions affecting orientation sensor 173 or pressure sensor 222.

Other Possible Sensors

One or more shock sensors 177 (FIG. 1c), that include a mass (that is, a weight) and a pressure or position sensor, where the mass is free to move and, thus, stimulate the pressure or position sensor when the skateboard, and, thus, the weight, are accelerated abruptly (shocked), can also be incorporated in skateboard 10. The shock sensors send an electrical signal to controller 44 when the skateboard experiences a shock of a predetermined level, for example, when the user hits a crack in the road or a curb. The controller may respond by causing the motor to brake the skateboard.

Because different users may impact sensors differently or the sensor readings may drift, controller 44 may include an automatic sensor recalibration mechanism. Recalibration can be based on a range of values observed during normal use or when the user deliberately exercises critical sensors over their desired dynamic range.

Motorized Wheel Locking

Instead of mechanical locking mechanism 95 (FIG. 1c) for locking the wheels in place during the wheels-locked mode, controller 44 may be configured to cause motor 32 to apply reverse or forward torque to the rear wheels as required to prevent rear wheel movement. Mechanical locks, however, have the advantage of not draining the battery. Another way to reduce power dissipation due only to user stabilization when the user is stationary is to apply stabilizing torques only after the skateboard rolls an allowable distance, perhaps a few centimeters; such actuation also alerts the user that better balance is required.

One alternative means for locking an undriven pair of wheels, or any single wheel, is to use some variation of a friction brake where a brake lining is placed in pressure contact with a rotating member coupled to the rotating wheel, or with the wheel itself, so as to slow the wheel down at the desired rate or to render it motionless. This pressure contact can be implemented by a separate electric motor driven by a separate port on the power electronics unit 76 in accordance with commands provided by a separate lower level control mechanism 90, or directly by the upper level control mechanism 92.

One variation would have two front steering wheels free to spin separately on one axle, where each wheel is rigidly coupled to a separate brake-pad forcing mechanism which forces the brake pad upon command to rub against the side of the wheel with pressure proportional to the desired braking force. The brake motor, perhaps through a worm gear pulling against springs, can withdraw the brake pads from the wheels. Thus, brake-motor failure could trigger braking. This entire motor and brake assemble could be mounted rigidly to the front steering truck and could be connected by flexible wires to the motor controller. Alternatively, such motorized control could be applied to the sliding brake switch 95c.

Triggers

Optional triggering signals can initiate standardized braking or acceleration protocols, a skateboard mode change, locking or unlocking the skateboard or brakes, and identifying the skateboard owner. Such triggering signals can include: jumping which reduces weight on the skateboard below a predetermined threshold; stamping on a skateboard once or twice; holding the skateboard aloft in specified orientations for predetermined periods; a push backward; a velocity greater than a predetermined threshold; initiation of a recognized braking action; banging the skateboard against the ground and detecting this action with direction-sensitive accelerometers (for example, two bangs at the correct interval might initiate motion); and tapping the front or rear of the skateboard in a prescribed manner sensed by sensor 222.

User Indicators

User indicators 82 (FIG. 3) can include many devices, including simple indicator lights, acoustic signals, and liquid-crystal displays. Useful indications produced by controller 44 include battery voltage and state of charge, likely skateboard travel range under available power, low-power warning signals, mode state, and malfunction indications. One or more lights may also be provided for use at night (that is, headlight 207) to illuminate the road immediately ahead of the skateboard and as a warning to motorists or others fore or aft. One or more light sources on the power electronics board may be coupled in desired directions by light waveguides, eliminating wires and permitting one light source to do the work of several.

Panic Button

In addition to the braking options discussed above, the user may be provided with a hand-held panic button (that is, a kill switch that initiates automatic braking).

Observed User Skills

The active control system of the present invention permits speed limits to be placed on the drive motor(s) dependent on the observed braking skill of the user, where more skill authorizes higher speed limits. For example, braking skill can be determined from the observed user stopping distances for various speeds, where observed shorter stopping distances and smoother decelerations merit higher allowed user velocities.

Cooling

Power dissipation is typically greatest in the motor and battery pack. This high power dissipation may require cooling, including conduction, radiation, and fluid convection; with the possible use of radiators or cooling fins. Reduced loading may also be imposed by the controller when temperature sensors indicate a dangerous rise in temperature.

Rechargeable Batteries

The life and performance of rechargeable batteries is maximized by proper charging protocols. These protocols can readily be implemented by the controller. The state of battery charge can be estimated from computer-controlled battery-impedance measurements obtained using the power electronics circuits. By knowing the time of day and historic use patterns for the skateboard, better compromises can also be made between rapid and slow charge protocols. Some batteries perform best if periodically discharged, and automatic deep discharges at night while the user sleeps are also feasible, where the load might be a cooled resistor or the motor.

Exercise Mode

The skateboard controller may require any desired level of user exertion by varying the motor decelerating (that is, reverse) torque. The controller can also keep track of a variety of parameters, such as amount of reverse torque (analogous to an exercise level), time spent exercising, cumulative user exertion, etc.

The prescribed torque or velocity and prescribed operating mode and characteristics can be preset or set by the user through any of a variety of signalling techniques, such as those described above. The work performed on the motors can be used to charge the batteries, heat the motors or a cooled resistive load, or electrically power an external load. The controller can keep track of all user exercise and provide signals reporting the user's progress, perhaps by acoustic beeps, computer printout, or synthesized speech from a small acoustic transducer on the skateboard.

Security Devices

A variety of security devices may be incorporated in skateboard 10 (FIG. 1a). For example, the skateboard can be easily immobilized by controller 44 if the weight distribution sensors detect a new user weight beyond a predetermined range or until an authorization code is input using leg and board motions (detected by pressure or orientation sensors), switch manipulation, speech recognition, or through a keypad requiring a particular combination input.

Speech Recognition

Not only can speech recognition be used to input authorization codes, but through speech recognition sensors, comprising a microphone, computer, and speech recognition software, a user can verbally command the skateboard. For instance, a user can say "brake" to slow down, "stop" to completely stop, and "faster" to accelerate. Additionally, to prevent the skateboard from responding to the speech of others, the controller can be programmed to respond to a verbal command only after a predetermined initial verbal or sensor trigger is given followed by verbal commands. In this instance, of course, the necessary computer hardware and software would be installed in controller 44.

Safety Devices

A variety of user safety devices can be incorporated in skateboard 10. For instance, different users of the same skateboard might be assigned different speed limits or different default modes and parameters. Rented or leased skateboards may also cease operation unless an authorization code is periodically received reflecting payments. The authorization codes can be input in many ways including through switches or communicated through coded audio signals over the telephone to an audio transducer 305 (FIG. 1a) on the skateboard or through a telephone modem 161 on the skateboard. The same audio transducer can support diagnostic and service functions to update computer programs or allow for skateboard customization. Built-in driver-testing or road characterization programs can be used to establish speed limits or other control parameters. For example, erratic acceleration, braking, weaving, or road vibration can cause controller 44 to lower the speed limits.

Internal Carrying Bag

To facilitate transparent transitions between skateboarding, traveling in automobiles or public transportation, and walking, a waterproof bag 187 (FIG. 1b) can be provided to enclose the skateboard and to protect the user from dirt, rain, or water left on the skateboard. The bag, or the corresponding edge of the skateboard itself, can also have back straps or a belt to permit easy carriage of the skateboard on the user's back or waist. Such a bag can be stored inside a case 188 and pulled out through hole 189 by grasping a small handle 192. The other end of the bag can be attached to an elastic member 193 which pulls the bag inside the skateboard and out of sight after the bag no longer encloses the skateboard.

Referring to FIGS. 8a and 8b, the user can easily shift from riding the skateboard to carrying it by handle 221 (FIG.

1c) when using public transportation, shopping, or otherwise engaged. Alternatively, the bagged skateboard 195 can be thrown over the user's back so that a velcro patch 198 on the bag engages the sticking surface covering the shoulder straps 196 of the carrying harness 199. Further support for the bag can be obtained by hooking ring 192 over hook 192a located on the strap 196 on the front of-the harness 199, which is easily accessible to the user. Ring 192 is attached to the bag by cord 194. Belt portion 197 of the harness 199 provides additional support. To use the skateboard, the user unhooks ring 192 from hook 192a and pulls on cord 194 so as to detach the velcro patch 198 and the bagged skateboard 195 from the harness 199. The user can then easily remove the skateboard from the bag 187 and store the bag in its case 188, rendering the skateboard useable. Alternatively, the exterior surface of the bag, or the corresponding edge of the skateboard itself, can be provided with fasteners 201 that link to the back of the user's belt, permitting the skateboard to be carried laterally across the user's back just below the belt.

Trailer for Baggage

Figure 9:
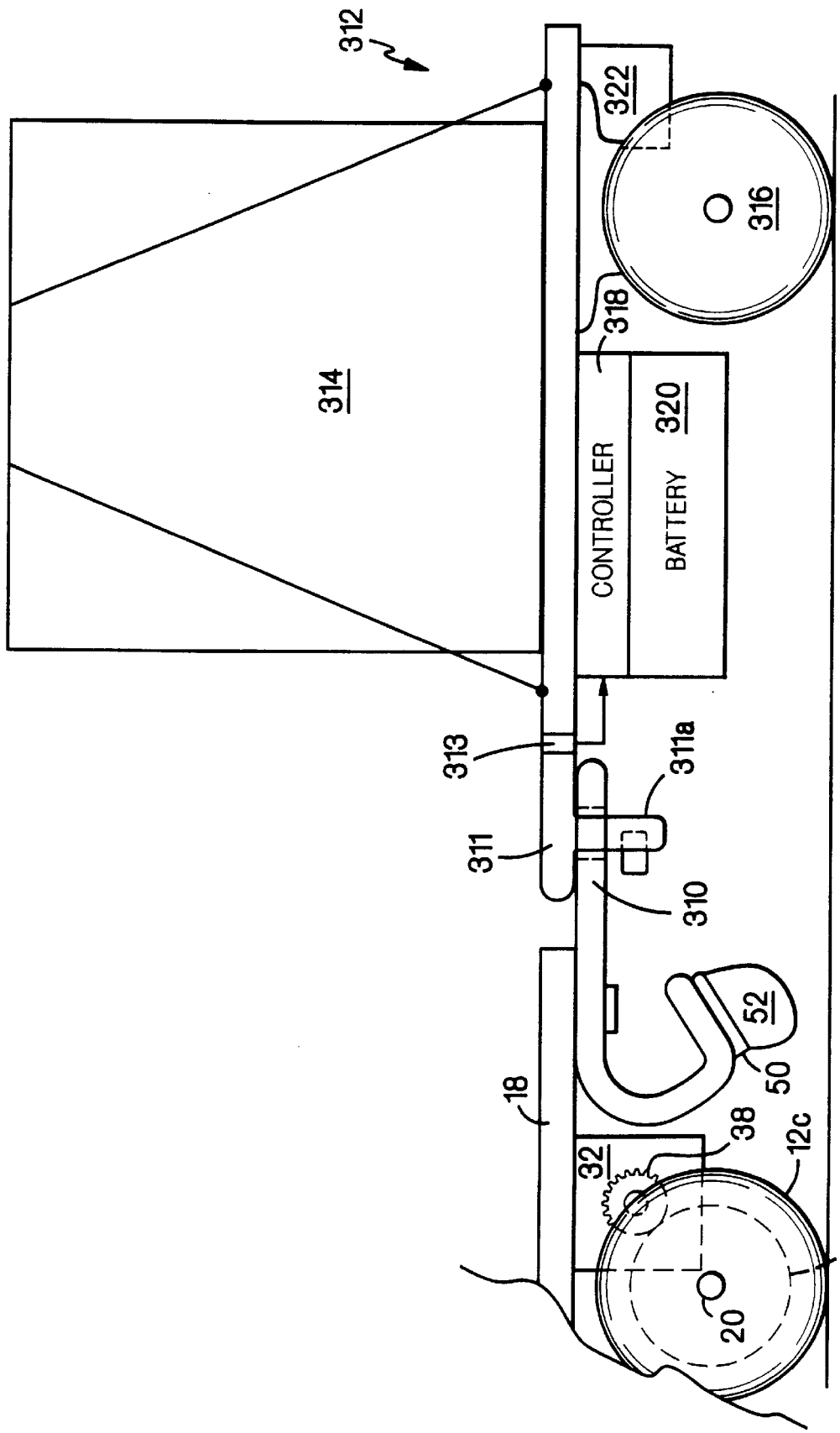
FIG. 9 is a side view of a baggage trailer attached to the powered skateboard of FIGS. 1a, 1b, 1c.

Referring to FIG. 9, an alternative embodiment of a powered skateboard includes a mounting mechanism 310, for example, a trailer hitch (similar to those provided for automobiles), that allows the skateboard to be connected to a separate trailer 312. The trailer can be used to convey baggage 314, such as a brief case or grocery bag. The trailer includes a baggage support 311 having a hitching mechanism 311a that can be used to mechanically couple the trailer to the skateboard. The baggage support is supported by a separate load-bearing wheel 316, or set of wheels, and that turn without impeding the user's turns, and go straight without deflecting the user's normal forward motion. The trailer might be a two-wheel trailer attached to the skateboard, and may or may not have its own controller 318, battery pack 320, and motor 322. A separate motor 322 and battery pack 320 may allow the trailer to carry larger loads and minimize stress on mounting mechanism 310 and hitching mechanism 311, and skateboard motor 32. This stress can be measured by stress sensor 313 connected to controller 318. The trailer may also be in the form of a one-wheel platform or side car (not shown) attached more rigidly to the side of the skateboard.

Additions, subtractions, and other modifications of the invention will be apparent to those practiced in the art and are within in the following claims.

What is claimed is:

1. A powered skateboard comprising:
   a foot support;
   a plurality of wheels rotatably mounted to the foot support;
   a motor coupled to at least one of the wheels; and
   an active control system including:
      a sensor located on the skateboard;
      a controller coupled to the sensor and to the motor; and
      the controller, in response to electrical signals from the sensor and electrical signals from the motor, indicating the state of the motor, and in accordance with a control mechanism, sending electrical signals to the motor to control the operation of the motor.

2. The powered skateboard according to claim 1, wherein the sensor detects a user's natural skateboarding motion and the electrical signals sent from the sensor to the controller represent the user's natural skateboarding motion.

3. The powered skateboard according to claim 2, wherein the sensor is a pressure sensor and wherein the user's weight distribution across the sensor is used to detect the user's natural skateboarding motion.

4. The powered skateboard according to claim 3, wherein the sensor is mounted to the foot support to detect pressure applied to the foot support.

5. The powered skateboard according to claim 4, wherein the sensor is embedded in a forward portion of the foot support.

6. The powered skateboard according to claim 5, wherein the controller sends electrical signals to the motor causing the motor to accelerate when the sensor indicates that the user's weight on the forward portion of the foot support falls within a predetermined range.

7. The powered skateboard according to claim 6, wherein the controller causes the motor to accelerate as a function of the amount of pressure detected by the sensor.

8. The powered skateboard according to claim 6, wherein the controller sends electrical signals to the motor causing the motor to decelerate when the sensor indicates that the user's weight on the forward portion of the foot support is outside the predetermined range.

9. The powered skateboard according to claim 8, wherein the controller causes the motor to decelerate in inverse proportion to the amount of pressure detected by the sensor.

10. The powered skateboard according to claim 4, wherein the sensor is embedded in a rearward portion of the foot support.

11. The powered skateboard according to claim 10, wherein the controller sends electrical signals to the motor causing the motor to decelerate when the sensor indicates that the user's weight on the rearward portion of the foot support exceeds a predetermined threshold.

12. The powered skateboard according to claim 11, wherein the controller causes the motor to decelerate as a function of the amount of pressure detected by the sensor.

13. The powered skateboard according to claim 11, further including a second pressure sensor, coupled to the controller, for sending electrical signals representing the user's weight distribution to the controller, wherein the second pressure sensor is embedded in a forward portion of the foot support.

14. The powered skateboard according to claim 13, wherein the controller sends electrical signals to the motor causing the motor to accelerate when the pressure sensors indicate a forward distribution of the user's weight.

15. The powered skateboard according to claim 14, wherein the controller causes the motor to accelerate as a function of the forward distribution of the user's weight.

16. The powered skateboard according to claim 13, wherein the controller sends electrical signals to the motor causing the motor to decelerate when the pressure sensors indicate a rearward distribution of the user's weight.

17. The powered skateboard according to claim 16, wherein the controller causes the motor to decelerate as a function of the rearward distribution of the user's weight.

18. The powered skateboard according to claim 3, wherein the plurality of wheels are rotatably mounted to the foot support through a plurality of axles and wherein the sensor is coupled to one of the plurality of axles.

19. The powered skateboard according to claim 1, wherein the sensor is a pressure sensor and is mounted to the foot support for detecting a user's total weight, and wherein the controller sends electrical signals to the motor to prevent the motor from starting when the weight detected by the sensor falls outside a predetermined range.

20. The powered skateboard according to claim 1, wherein the sensor is a segmented pressure sensor embedded in the foot support for detecting pressure from a user's feet.

21. The powered skateboard according to claim 20, wherein the controller controls the operation of the motor in accordance with detected predetermined spatial patterns of pressure on the segmented pressure sensor.

22. The powered skateboard according to claim 21, wherein the detected predetermined patterns of pressure on the segmented pressure sensor indicate a plurality of operational modes according to which the controller controls the operation of the motor.

23. The powered skateboard according to claim 2, wherein the sensor is a segmented position sensor for detecting distance between the user's feet, the distance indicating the user's natural skateboarding motion.

24. The-powered skateboard according to claim 23, wherein the controller sends electrical signals to the motor causing the motor to accelerate when the distance between the user's feet is greater than a predetermined threshold.

25. The powered skateboard according to claim 24, wherein the controller causes the motor to accelerate as a function of the distance detected by the sensor.

26. The powered skateboard according to claim 23, wherein the controller sends electrical signals to the motor causing the motor to decelerate when the distance between the user's feet is less than a predetermined threshold.

27. The powered skateboard according to claim 26, wherein the controller causes the motor to decelerate as a function of the distance detected by the sensor.

28. The powered skateboard according to claim 23, wherein the controller sends electrical signals to the motor causing the motor to accelerate when the distance between the user's feet is less than a predetermined threshold.

29. The powered skateboard according to claim 28, wherein the controller causes the motor to accelerate as a function of the distance detected by the sensor.

30. The powered skateboard according to claim 23, wherein the controller sends electrical signals to the motor causing the motor to decelerate when the distance between the user's feet is greater than a predetermined threshold.

31. The powered skateboard according to claim 30, wherein the controller causes the motor to decelerate as a function of the distance detected by the sensor.

32. The powered skateboard according to claim 2, wherein the sensor is an orientation sensor.

33. The powered skateboard according to claim 32, wherein the controller sends electrical signals to the motor to cause the motor to decelerate when the orientation sensor indicates that the skateboard is outside of a predetermined orientation range.

34. The powered skateboard according to claim 33, wherein the controller causes the motor to decelerate as a function of the orientation detected by the sensor.

35. The powered skateboard according to claim 32, wherein the controller controls the operation of the motor in accordance with detected predetermined patterns of skateboard orientation.

36. The powered skateboard according to claim 35, wherein one of the detected predetermined patterns of orientation causes the controller to send electrical signals to the motor to start the motor.

37. The powered skateboard according to claim 35, wherein the detected predetermined patterns of orientation indicate a plurality of operational modes according to which the controller controls the operation of the motor.

38. The powered skateboard according to claim 1, further comprising a rear braking surface mounted to the foot support, wherein the sensor is a pressure sensor and is coupled to the rear braking surface to detect pressure on the rear braking surface.

39. The powered skateboard according to claim 38, wherein the controller sends electrical signals to the motor to cause the motor to decelerate when the sensor detects pressure above a predetermined threshold.

40. The powered skateboard according to claim 39, wherein the controller causes the motor to decelerate as a function of the amount of pressure detected by the sensor.

41. The powered skateboard according to claim 38, wherein the rear braking surface is mounted to a rear portion of the foot support.

42. The powered skateboard according to claim 1, wherein the sensor is a temperature sensor and the controller increasingly limits the current provided to the motor as the temperature rises further above a threshold.

43. The powered skateboard according to claim 1, wherein the sensor is a temperature sensor and the controller sends electrical signals to the motor to prevent the motor from starting when the sensor detects a temperature below a predetermined threshold.

44. The powered skateboard according to claim 42, wherein the sensor is a temperature sensor and the temperature sensor detects an environmental temperature.

45. The powered skateboard according to claim 42, wherein the temperature sensor detects a motor temperature.

46. The powered skateboard according to claim 42, wherein the controller includes electronic components and wherein the temperature sensor detects the temperature of the electronic components.

47. The powered skateboard according to claim 42, wherein the motor is an electric motor and the skateboard further comprises a battery pack coupled to the motor for supplying power to the motor, and wherein the temperature sensor detects the temperature of the battery pack.

48. The powered skateboard according to claim 1, wherein the controller determines motor temperature as a function of motor winding resistance.

49. The powered skateboard according to claim 42, wherein the controller determines motor temperature as a function of the history of motor current and environmental temperature, in accordance with a thermal model defined by the control mechanism, and the determined motor temperature is used to limit the maximum allowed motor current.

50. The powered skateboard according to claim 1, wherein the sensor is a shock sensor.

51. The powered skateboard according to claim 50, wherein the controller sends electrical signals to the motor to cause the motor to decelerate when the shock sensor detects a shock above a predetermined threshold.

52. The powered skateboard according to claim 51, wherein the controller causes the motor to decelerate as a function of the shock detected by the sensor.

53. The powered skateboard according to claim 50, wherein the controller controls the operation of the motor in accordance with detected predetermined patterns of shocks detected by the shock sensor.

54. The powered skateboard according to claim 53, wherein one of the detected predetermined patterns of shocks causes the controller to send electrical signals to the motor to start the motor.

55. The powered skateboard according to claim 53, wherein the detected predetermined patterns of shock indicate a plurality of operational modes according to which the controller controls the operation of the motor.

56. The powered skateboard according to claim 1, wherein the controller includes a sensor recalibration mechanism for automatically, periodically recalibrating the sensor.

57. The powered skateboard according to claim 1, wherein the sensor is a segmented pressure sensor for detecting the distance between the user's feet and the rear of the segmented sensor.

58. The powered skateboard according to claim 57, wherein the controller sends electrical signals to the motor to cause the motor to decelerate when the detected distance is less than a predetermined distance.

59. The powered skateboard according to claim 58, wherein the controller causes the motor to decelerate as a function of the distance.

60. The powered skateboard according to claim 57, wherein the controller sends electrical signals to the motor to cause the motor to accelerate when the distance is more than a predetermined distance.

61. The powered skateboard according to claim 60, wherein the controller causes the motor to accelerate as a function of the distance.

62. The powered skateboard according to claim 1, wherein the sensor is a pressure sensor for detecting a user's lateral weight distribution.

63. The powered skateboard according to claim 62, wherein the controller sends electrical signals to the motor to cause the motor to turn one or more of the plurality of wheels in accordance with the user's detected lateral weight distribution.

64. The powered skateboard according to claim 1, wherein the sensor is a mode switch manipulated by the user to indicate an operational mode.

65. The powered skateboard according to claim 1, wherein the sensor is a kill switch which, when manipulated by the user, causes the controller to send electrical signals to the motor to stop the motor.

66. The powered skateboard according to claim 1, wherein the control mechanism includes a plurality of operational parameters which the controller uses to control the operation of the motor.

67. The powered skateboard according to claim 66, wherein one of the plurality of operational parameters is a speed limit, and wherein the controller determines the motor angular velocity through the electrical signals received from the motor and sends electrical signals to the motor to cause the motor to decelerate if the motor angular velocity exceeds the speed limit.

68. The powered skateboard according to claim 66, wherein the plurality of operational parameters are set in accordance with a user's skateboarding ability as detected by the sensor.

69. The powered skateboard according to claim 66, wherein the plurality of operational parameters are set in accordance with observed road conditions as detected by the sensor.

70. The powered skateboard according to claim 66, wherein the plurality of operational parameters are set in accordance with a user's skateboarding ability in accordance with a detected motor current history and a detected motor voltage history.

71. The powered skateboard according to claim 66, wherein the plurality of operational parameters are set in accordance with observed road conditions in accordance with a detected motor current history and a detected motor voltage history.

72. The powered skateboard according to claim 66, wherein the plurality of operational parameters are set in accordance with the motor's capabilities.

73. The powered skateboard according to claim 1, wherein the controller comprises
an upper level control mechanism, and
a lower level control mechanism,
wherein the lower level control mechanism sends electrical signals to and receives electrical signals from the motor, determines an estimated motor torque using the electrical signals from the motor, receives electrical signals from the sensor, and sends electrical signals representing the estimated motor torque and the electrical signals from the sensor to the upper level control mechanism, and
wherein the upper level control mechanism, in response to the electrical signals from the lower level control mechanism, in accordance with the control mechanism, sends electrical signals to the lower level control mechanism indicating a desired motor torque.

74. The powered skateboard according to claim 1, wherein the controller comprises
an upper level control mechanism, and
a lower level control mechanism,
wherein the lower level control mechanism sends electrical signals to and receives electrical signals from the motor, determines an estimated motor angular velocity using the electrical signals from the motor, receives electrical signals from the sensor, and sends electrical signals representing the estimated motor angular velocity and the electrical signals from the sensor to the upper level control mechanism, and
wherein the upper level control mechanism, in response to the electrical signals from the lower level control mechanism in accordance with the control mechanism, sends electrical signals to the lower level control mechanism indicating a desired motor angular velocity.

75. The powered skateboard according to claim 1, wherein the controller comprises
an upper level control mechanism, and
a lower level control mechanism,
wherein the lower level control mechanism sends electrical signals to and receives electrical signals from the motor, determines an estimated motor torque and an estimated motor angular velocity using the electrical signals from the motor, receives electrical signals from the sensor, and sends electrical signals representing the estimated motor torque and the estimated motor angular velocity and the electrical signals from the sensor to the upper level control mechanism, and
wherein the upper level control mechanism, in response to the electrical signals from the lower level control mechanism in accordance with the control mechanism, sends electrical signals to the lower level control mechanism indicating a desired motor torque, motor angular velocity, and motor angular acceleration.

76. The powered skateboard according to claim 1, wherein the controller includes a computer having a central processing unit, a clock, and a memory.

77. The powered skateboard according to claim 76, further including a battery back-up unit electrically coupled to the computer.

78. The powered skateboard according to claim 1, further comprising an input/output port for electrically coupling the controller to an input/output bus.

79. The powered skateboard according to claim 1, wherein the motor is an electric motor and further comprising
a battery pack electrically coupled to the motor for supplying power to the motor, wherein the battery pack contains at least one rechargeable battery, and
a recharging port electrically coupled to the battery pack for recharging the at least one rechargeable battery.

80. The powered skateboard according to claim 1, further comprising
   a power output port coupled to the controller for supplying electrical power to external devices.

81. The powered skateboard according to claim 1, further comprising
   a communication system coupled to the controller for sending data to and receiving data from an external communication system.

82. The powered skateboard according to claim 81, wherein the communication system sends information to the external communication system to indicate a status of the powered skateboard and the external communication system sends data to the communication system to modify the control mechanism.

83. The powered skateboard according to claim 1, wherein the controller, in accordance with an operational mode defined by the control mechanism, sends electrical signals to the motor to cause the motor to prevent the wheels from rotating.

84. The powered skateboard according to claim 1, further comprising
   a wheel locking mechanism, mechanically coupled to the plurality of wheels, wherein the wheel locking mechanism when activated prevents the wheels from rotating.

85. The powered skateboard according to claim 84, wherein the plurality of wheels are rotatably mounted to the foot support through a plurality of axles and wherein the wheel locking mechanism includes:
   at least one tube mounted to the foot support;
   at least one wire slidably disposed within the tube; and
   a mechanism for advancing the wire within the tube to prevent one of the plurality of wheels from rotating and for pulling the wire back within the tube to allow the one of the plurality of wheels to rotate.

86. The powered skateboard according to claim 1, wherein the controller, in accordance with an operational Mode defined by the control mechanism, sends electrical signals to the motor to cause the motor to compensate for motor and drive train friction.

87. The powered skateboard according to claim 1, wherein the controller, in accordance with an operational mode defined by the control mechanism, sends electrical signals to the motor to cause the motor to establish a motor torque that maintains the skateboard velocity established when the user last placed the user's full weight on the skateboard.

88. The powered skateboard according to claim 87, wherein the sensor detects when the user last placed the user's full weight on the skateboard.

89. The powered skateboard according to claim 87, wherein the controller uses the electrical signals from the motor to determine when the user last placed the user's full weight on the skateboard.

90. The powered skateboard according to claim 1, wherein the sensor is a pressure sensor coupled to the foot support for detecting a user weight distribution across the foot support and wherein the controller, in accordance with an operational mode defined by the control mechanism, sends electrical signals to the motor to cause the motor to establish a motor torque that accelerates and decelerates the skateboard in accordance with the user's weight distribution.

91. The powered skateboard according to claim 1, wherein the sensor detects a distance between a user's feet and wherein the controller, in accordance with an operational mode defined by the control mechanism, sends electrical signals to the motor to cause the motor to establish a motor torque that accelerates and decelerates the skateboard in accordance with the distance between the user's feet.

92. The powered skateboard according to claim 1, wherein the sensor detects the angles of a user's feet relative to the longitudinal axis of the skateboard and wherein the controller, in accordance with an operational mode defined by the control mechanism, sends electrical signals to the motor to cause the motor to establish a motor torque that accelerates and decelerates the skateboard in accordance with these relative angles of the user's feet.

93. The powered skateboard according to claim 1, wherein the sensor detects a weight distribution across each user's foot and wherein the controller, in accordance with an operational mode defined by the control mechanism, sends electrical signals to the motor to cause the motor to establish a motor torque that accelerates and decelerates the skateboard in accordance with the weight distribution across each of the user's feet.

94. The powered skateboard according to claim 1, wherein the sensor detects a position of a user's front foot and a position of a user's rear foot and wherein the controller, in accordance with an operational mode defined by the control mechanism, sends electrical signals to the motor to cause the motor to establish a motor torque that accelerates and decelerates the skateboard in accordance with the positions of the user's feet.

95. The powered skateboard according to claim 1, wherein the sensor detects an average position of a user's feet and wherein the controller, in accordance with an operational mode defined by the control mechanism, sends electrical signals to the motor to cause the motor to establish a motor torque that accelerates and decelerates the skateboard in accordance with changes in the average position of the user's feet.

96. The powered skateboard according to claim 1, wherein the motor is an electric motor and further comprising
   a battery pack electrically coupled to the motor for supplying power to the motor, wherein the battery pack contains at least one rechargeable battery and wherein excess energy supplied by a user to move the skateboard is transferred to the battery pack to recharge the at least one rechargeable battery.

97. The powered skateboard according to claim 1, further comprising
   an indicator device electrically coupled to the controller, for providing information to a user.

98. The powered skateboard according to claim 97, wherein the indicator device visually displays information to the user.

99. The powered skateboard according to claim 98, wherein the indicator is a light.

100. The powered skateboard according to claim 99, wherein the light is a light emitting diode.

101. The powered skateboard according to claim 98, wherein the indicator is a liquid crystal display.

102. The powered skateboard according to claim 97, wherein the indicator device acoustically transmits information to the user.

103. The powered skateboard according to claim 97, wherein the information includes battery status.

104. The powered skateboard according to claim 97, wherein the information includes active control system error status.

105. The powered skateboard according to claim 97, wherein the information includes a violation of a predetermined speed limit.

106. The powered skateboard according to claim 1, wherein the motor is mounted to the foot support.

107. The powered skateboard according to claim 1, wherein the active control system is mounted to the foot support.

108. The powered skateboard according to claim 1, wherein the motor is an electric motor.

109. The powered skateboard according to claim 108, wherein the motor is a brushless, permanent magnet electric motor.

110. The powered skateboard according to claim 99, further comprising a battery pack electrically coupled to the motor.

111. The powered skateboard according to claim 110, wherein the battery pack is mounted to the foot support.

112. The powered skateboard according to claim 1, wherein the motor is an internal combustion engine.

113. The powered skateboard according to claim 1, further comprising:
a plurality of axles through which the plurality of wheels are mounted to the foot support, wherein the motor is coupled through a pair of gears to one of the plurality of axles.

114. The powered skateboard according to claim 1, wherein the plurality of wheels include two front wheels rotatably coupled to a first axle which is mounted to a front portion of the foot support through a first axle assembly and two rear wheels rotatably coupled to a second axle which is mounted to a rear portion of the foot support through a second axle assembly.

115. The powered skateboard according to claim 114, wherein the two front wheels are movably mounted with respect to the two rear wheels to allow the two front wheels to be mounted varying distances from the two rear wheels.

116. The powered skateboard according to claim 1, wherein the plurality of wheels include one front wheel rotatably coupled to a first axle which is mounted to a front portion of the foot support through a first axle assembly and two rear wheels rotatably coupled to a second axle which is mounted to a rear portion of the foot support through a second axle assembly.

117. The powered skateboard according to claim 1, wherein the plurality of wheels include two front wheels rotatably coupled to a first axle which is mounted to a front portion of the foot support through a first axle assembly and one wide rear wheel rotatably coupled to a second axle which is mounted to a rear portion of the foot support through a second axle assembly.

118. The powered skateboard according to claim 1, wherein the plurality of wheels include one front wheel rotatably coupled to a first axle which is mounted to a front portion of the foot support through a first axle assembly and one wide rear wheel rotatably coupled to a second axle which is mounted to a rear portion of the foot support through a second axle assembly.

119. The powered skateboard according to claim 1, wherein the plurality of wheels include one front wheel rotatably coupled to a first axle which is mounted to a front portion of the foot support through a first axle assembly, one rear wheel rotatably coupled to a second axle which is mounted to a rear portion of the foot support through a second axle assembly, and two center wheels rotatably coupled to a third axle which is mounted to a center portion of the foot support through a third axle assembly.

120. The powered skateboard according to claim 1, further comprising
suspension mechanisms coupled to the plurality of wheels.

121. The powered skateboard according to claim 1, further comprising
a turning mechanism coupled to at least one of the plurality of wheels.

122. The powered skateboard according to claim 1, further comprising
a security device for allowing an authorized user use of the powered skateboard.

123. The powered skateboard according to claim 122, wherein the security device is a mechanical lock released with a key.

124. The powered skateboard according to claim 122, wherein the security device is an electronic key pad activated with a predetermined sequence of characters.

125. The powered skateboard according to claim 1, wherein the sensor is a speech recognition sensor for receiving verbal user commands.

126. The powered skateboard according to claim 125, wherein the sensor is a security device for allowing an authorized user use of the powered skateboard.

127. The powered skateboard according to claim 1, wherein the sensor is an audio transducer for receiving acoustic information.

128. The powered skateboard according to claim 127, wherein the acoustic information includes an authorization code.

129. The powered skateboard according to claim 1, further comprising
a case for covering the motor and the active control system.

130. The powered skateboard according to claim 1, further comprising:
a trailer that is mechanically coupled to the foot support.

131. The powered skateboard according to claim 130, wherein the trailer is motorized and is electrically coupled to the controller.

132. The powered skateboard according to claim 1, further comprising:
a case mounted to the foot support; and
a skateboard carrying bag stored within the case.

133. A powered skateboard comprising:
a foot support;
a plurality of wheels rotatably mounted to the foot support;
a motor coupled to at least one of the wheels; and
an active control system including:
a sensor;
a detector for detecting an operational mode of the skateboard;
a controller coupled to the sensor, the detector, and the motor;
the controller, in response to electrical signals from the detector indicating the operational mode of the skateboard, selecting an operational mode; and
the controller further, in response to electrical signals from the sensor and from the motor, and in accordance with the selected operational mode and a control mechanism, sending electrical signals to the motor to control the operation of the motor.

134. The powered skateboard according to claim 133, wherein the selected operational mode causes the controller to send electrical signals to the motor to cause the motor to prevent the wheels from rotating.

135. The powered skateboard according to claim 133, wherein the selected operational mode causes the controller to send electrical signals to the motor to cause the motor to compensate for motor and drive train friction.

136. The powered skateboard according to claim 133, wherein the selected operational mode causes the controller to send electrical signals to the motor to cause the motor to establish a motor torque that maintains the skateboard velocity established when a user last imposed the user's full weight on the skateboard.

137. The powered skateboard according to claim 136, wherein the sensor detects when the user last imposed the user's full weight on the skateboard.

138. The powered skateboard according to claim 136, wherein the controller uses the electrical signals from the motor to determine when the user last imposed the user's full weight on the skateboard.

139. The powered skateboard according to claim 133, wherein the sensor is a pressure sensor coupled to the foot support for detecting a user weight distribution across the foot support and wherein the selected operational mode causes the controller to send electrical signals to the motor to cause the motor to establish a motor torque that accelerates and decelerates the skateboard in accordance with the user's weight distribution.

140. The powered skateboard according to claim 133, wherein the sensor detects a distance between the user's feet and wherein the selected operational mode causes the controller to send electrical signals to the motor to cause the motor to establish a motor torque that accelerates and decelerates the skateboard in accordance with the distance between the user's feet.

141. The powered skateboard according to claim 133, wherein the sensor detects a relative position of a user's feet and wherein the controller, in accordance with an operational mode defined by the control mechanism, sends electrical signals to the motor to cause the motor to establish a motor torque that accelerates and decelerates the skateboard in accordance with the relative position of the user's feet.

142. A powered skateboard comprising:
a foot support;
a plurality of wheels rotatably mounted to the foot support;
a motor coupled to at least one of the wheels; and
an active control system including:
    a communication mechanism for communicating information about the skateboard external to the skateboard;
    a controller coupled to the communication mechanism; and
    the controller, in accordance with a control mechanism, sending electrical signals to the communication mechanism to cause the communication mechanism to indicate a status of the skateboard external to the skateboard.

143. The powered skateboard according to claim 142, wherein the communication mechanism is an indicator device.

144. The powered skateboard according to claim 143, wherein the indicator device visually displays information to a user.

145. The powered skateboard according to claim 144, wherein the indicator is a light.

146. The powered skateboard according to claim 145, wherein the light is a light emitting diode.

147. The powered skateboard according to claim 144, wherein the indicator is a liquid crystal display.

148. The powered skateboard according to claim 143, wherein the indicator device acoustically transmits information to a user.

149. The powered skateboard according to claim 143, wherein the information includes battery status.

150. The powered skateboard according to claim 143, wherein the information includes active control system error status.

151. The powered skateboard according to claim 143, wherein the information includes a violation of a predetermined speed limit.

152. A powered skateboard comprising:
a foot support;
a plurality of wheels rotatably mounted to the foot support;
a motor coupled to at least one of the wheels; and
an active control system including:
    a communication device for communicating information about the skateboard external to the skateboard;
    a controller coupled to the communication device;
    the controller sending electrical signals to the communication device to cause the communication device to indicate a status of the skateboard external to the skateboard; and
    the controller further, in response to electrical signals received from the communication device, modifying a control mechanism and control parameters to update the control mechanism.

153. The powered skateboard according to claim 152, wherein the communication device is an input/output port for connection to an input/output bus.

154. The powered skateboard according to claim 153, wherein the input/output bus is a Small Computer System Interconnect bus.

155. The powered skateboard according to claim 153, wherein the input/output port is a telephone modem.

156. The powered skateboard according to claim 153, wherein the input/output port is an acoustic telephone coupler.

157. A powered skateboard comprising:
a foot support;
a plurality of wheels rotatably mounted to the foot support;
a motor coupled to at least one of the wheels; and
an active control system including:
    a sensor;
    a controller coupled to receive electrical signals from the sensor; and
    the controller, in response to electrical signals received from the sensor, and in accordance with a control mechanism, modifying control parameters to update the control mechanism.

158. The powered skateboard according to claim 157, wherein the sensor is an audio transducer.

159. The powered skateboard according to claim 157, wherein the communication device is an speech recognition sensor.

160. The powered skateboard according to claim 157, wherein the communication device is a switch.

161. The powered skateboard according to claim 157, wherein the communication device is a keypad.

162. A powered skateboard comprising:
a foot support;
a plurality of wheels rotatably mounted to the foot support;
a motor coupled to at least one of the wheels; and
an active control system including:
    a detector for detecting when a user last imposed the user's full weight on the skateboard;

a controller coupled to the detector and to the motor; and the controller, in response to electrical signals from the detector and the motor, and in accordance with a control mechanism, setting the motor torque to cause the motor to maintain a skateboard velocity established when the user last imposed the user's full weight on the skateboard.

163. A powered skateboard comprising:

a foot support;

a plurality of wheels rotatably mounted to the foot support;

a motor coupled to at least one of the wheels; and an active control system including:
- a detector for detecting a user's weight distribution across the foot support;
- a controller coupled to the detector and to the motor; and
- the controller, in response to electrical signals from the detector and the motor, and in accordance with a control mechanism, sending electrical signals to the motor to activate the motor such that the skateboard velocity is accelerated and decelerated according to the user's weight distribution across the foot support.

164. A powered skateboard comprising:

a foot support;

a plurality of wheels rotatably mounted to the foot support;

a motor coupled to at least one of the wheels; and an active control system including:
- a segmented detector for detecting a user's weight distribution imposed on the foot support by each of the user's legs;
- a controller coupled to the detector and to the motor; and
- the controller, in response to electrical signals from the detector and the motor, and in accordance with a control mechanism, sending electrical signals to the motor to activate the motor such that the skateboard is accelerated and decelerated according to the user's weight distribution imposed on the foot support by each of the user's legs.

165. A powered skateboard comprising:

a foot support;

a plurality of wheels rotatably mounted to the foot support;

a motor coupled to at least one of the wheels; and an active control system including:
- a segmented detector for detecting an angle between a user's front foot and a longitudinal axis of the skateboard and an angle between the user's back foot and the longitudinal axis of the skateboard;
- a controller coupled to the detector and to the motor; and
- the controller, in response to electrical signals from the detector and the motor, and in accordance with a control mechanism, sending electrical signals to the motor to activate the motor such that the skateboard is accelerated and decelerated according to the angles between the user's feet and the longitudinal axis of the skateboard.

166. A powered skateboard comprising:

a foot support;

a plurality of wheels rotatably mounted to the foot support;

a motor coupled to at least one of the wheels; and an active control system including:
- a segmented detector for detecting a user's weight distribution across each of the user's feet;
- a controller coupled to the detector and to the motor; and
- the controller, in response to electrical signals from the detector and the motor, and in accordance with a control mechanism, sending electrical signals to the motor to activate the motor such that the skateboard is accelerated and decelerated according to the user's weight distribution across each of the user's feet.

167. A powered skateboard comprising:

a foot support;

a plurality of wheels rotatably mounted to the foot support;

a motor coupled to at least one of the wheels; and an active control system including:
- a detector for detecting a distance between the user's feet;
- a controller coupled to the detector and to the motor; and
- the controller, in response to electrical signals from the detector and the motor, and in accordance with a control mechanism, sending electrical signals to the motor to activate the motor such that the skateboard is accelerated and decelerated according to the distance between the user's feet.

168. The powered skateboard of claim 167, further comprising:

a second detector for detecting when the user's full weight is upon the skateboard, wherein the controller, in response to electrical signals from the second detector and the motor, and, in accordance with the control mechanism, sets the motor torque to cause the motor to maintain a skateboard velocity established when the user's full weight was last placed upon the skateboard.

169. A powered skateboard comprising:

a foot support;

a plurality of wheels rotatably mounted to the foot support;

a motor coupled to at least one of the wheels; and an active control system including:
- a detector for detecting an exercise mode of the skateboard;
- a controller coupled to the detector and to the motor; and
- the controller, in response to electrical signals from the motor and from the detector indicating the exercise mode, and in accordance with a control mechanism, sending electrical signals to the motor to cause the motor to apply a resisting torque to one or more of the plurality of wheels.

170. The powered skateboard of claim 169, wherein the detector further detects a user-desired exercise level.

* * * * *